(12) United States Patent
Ma et al.

(10) Patent No.: US 12,141,226 B2
(45) Date of Patent: Nov. 12, 2024

(54) SYSTEMS AND PROCESSES FOR ORGANIZING AND CONTROLLING MULTIPLE MATRIX PROCESSOR CIRCUITS

(71) Applicant: Expedera, Inc., Santa Clara, CA (US)

(72) Inventors: Siyad Chih-Hua Ma, Palo Alto, CA (US); Shang-Tse Chuang, Los Altos, CA (US); Sharad Vasantrao Chole, San Jose, CA (US)

(73) Assignee: Expedera, Inc., Santa Clara, CA (US)

( * ) Notice: Subject to any disclaimer, the term of this patent is extended or adjusted under 35 U.S.C. 154(b) by 5 days.

(21) Appl. No.: 16/377,103

(22) Filed: Apr. 5, 2019

(65) Prior Publication Data

US 2020/0226201 A1 Jul. 16, 2020

Related U.S. Application Data

(60) Provisional application No. 62/791,585, filed on Jan. 11, 2019.

(51) Int. Cl.
*G06F 17/16* (2006.01)
*G06N 3/04* (2023.01)

(52) U.S. Cl.
CPC ............. *G06F 17/16* (2013.01); *G06N 3/04* (2013.01)

(58) Field of Classification Search
CPC .... G06F 9/3877; G06F 9/3879; G06F 9/3881; G06F 9/3885; G06F 9/3887; G06F 9/3889; G06F 9/3891; G06F 9/3893; G06F 9/3895; G06F 9/3897; G06F 2009/3883; G06F 17/16; G06F 15/8053; G06F 15/8061; G06F 15/8069; G06F 15/8076; G06F 15/8084; G06F 15/8092; G06N 3/04; G06N 3/084; G06N 3/063
USPC ........................................................ 708/520
See application file for complete search history.

(56) References Cited

U.S. PATENT DOCUMENTS

2018/0189652 A1* 7/2018 Korthikanti ............ G06N 3/084
2019/0392297 A1* 12/2019 Lau .......................... G06N 3/08

\* cited by examiner

*Primary Examiner* — Tan V Mai
(74) *Attorney, Agent, or Firm* — Carr & Ferrell LLP

(57) ABSTRACT

Artificial intelligence is an increasingly important sector of the computer industry. However, artificial intelligence is extremely computationally intensive field such that it can be expensive, time consuming, and energy consuming. Fortunately, many of the calculations required for artificial intelligence can be performed in parallel such that specialized processors can greatly increase computational performance. Specifically, artificial intelligence generally requires large numbers of matrix operations to implement neural networks such that specialized Matrix Processor circuits can improve performance. But a neural network is more than a collection of matrix operations; it is a set of specifically coordinated matrix operations with complex data dependencies. Without proper coordination, Matrix Processor circuits may end up idle or spending large amounts of time loading in different weight matrix data. Thus this document discloses apparatus and methods for organizing and controlling multiple Matrix Processor circuits efficiently.

16 Claims, 34 Drawing Sheets

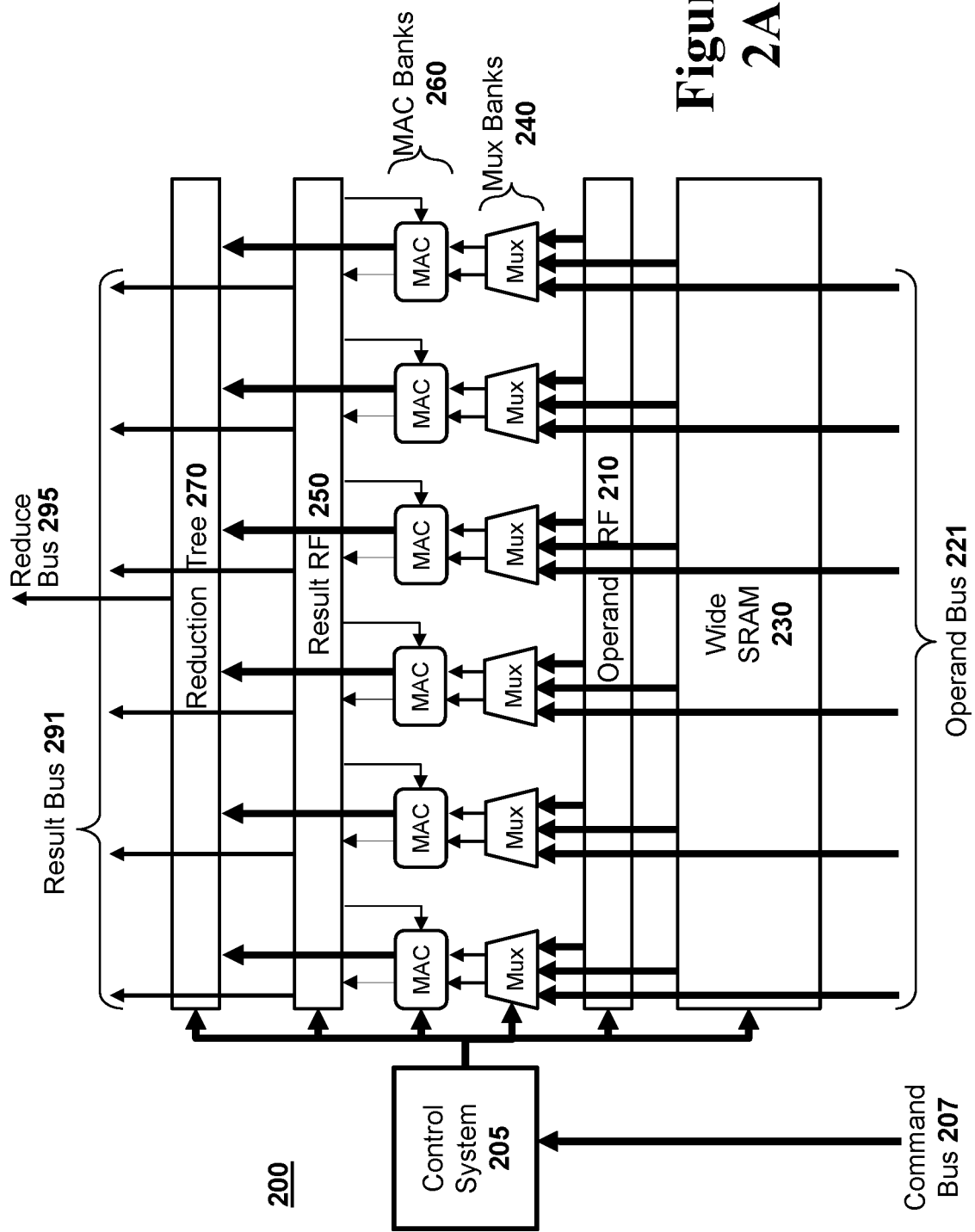

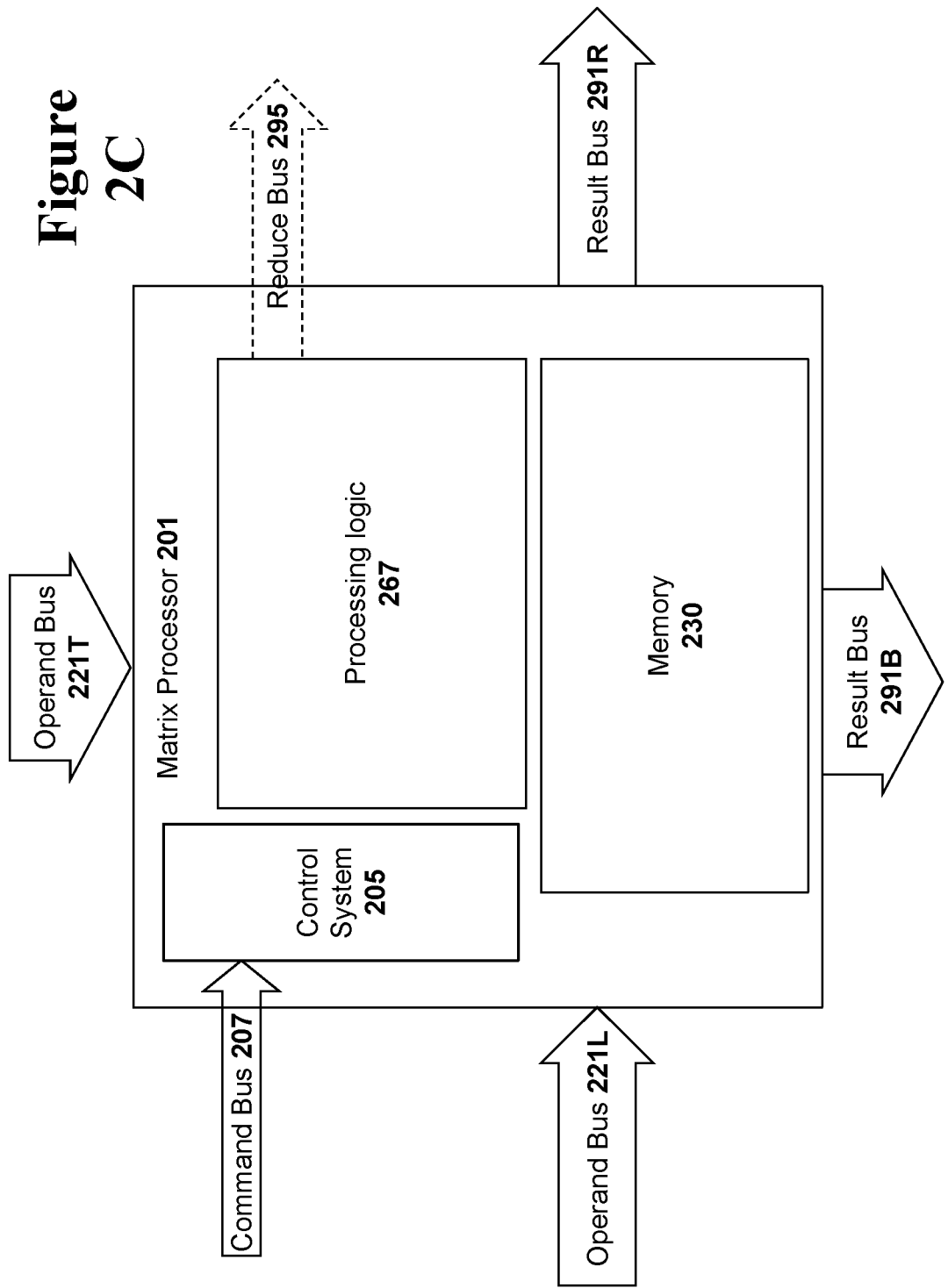

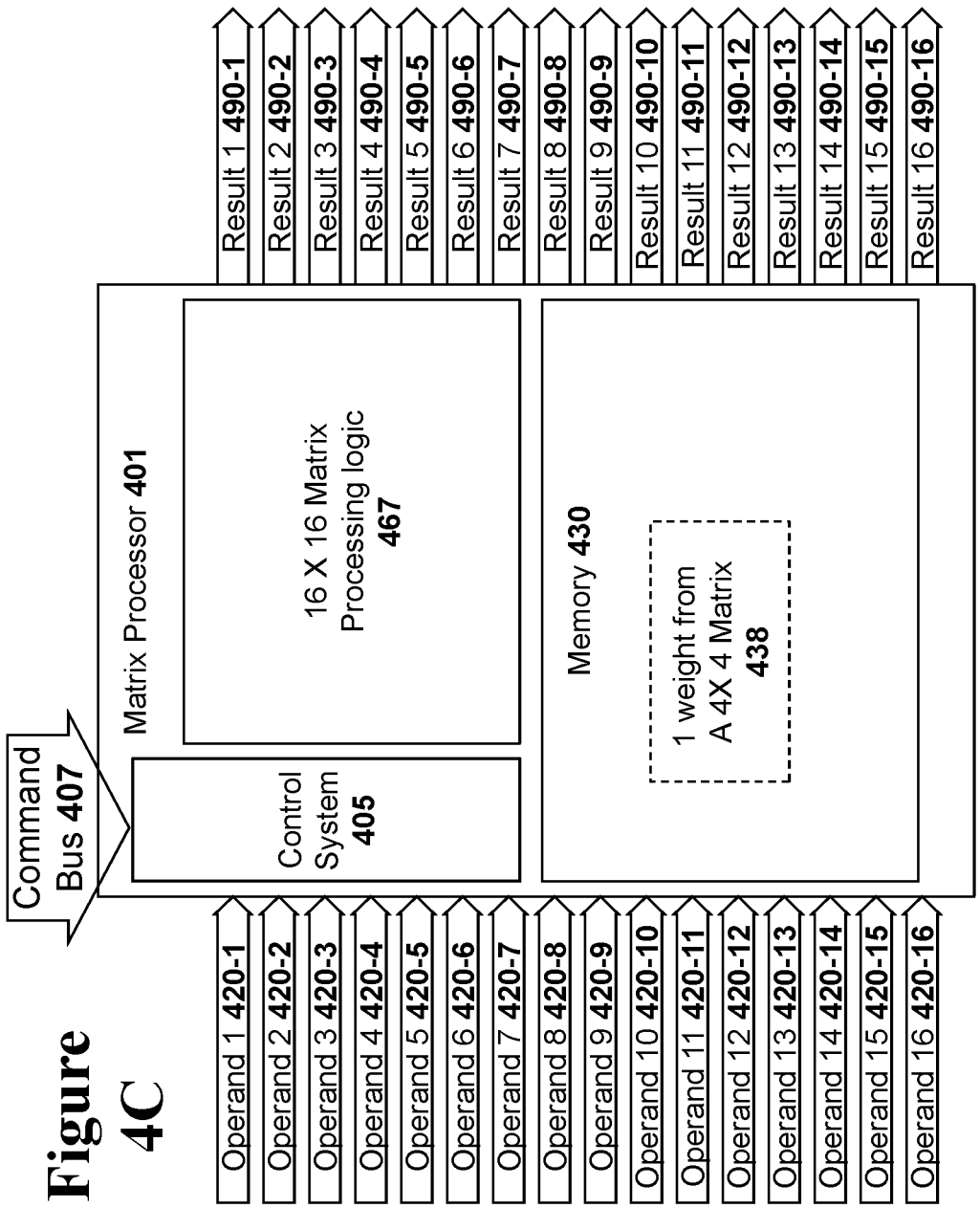

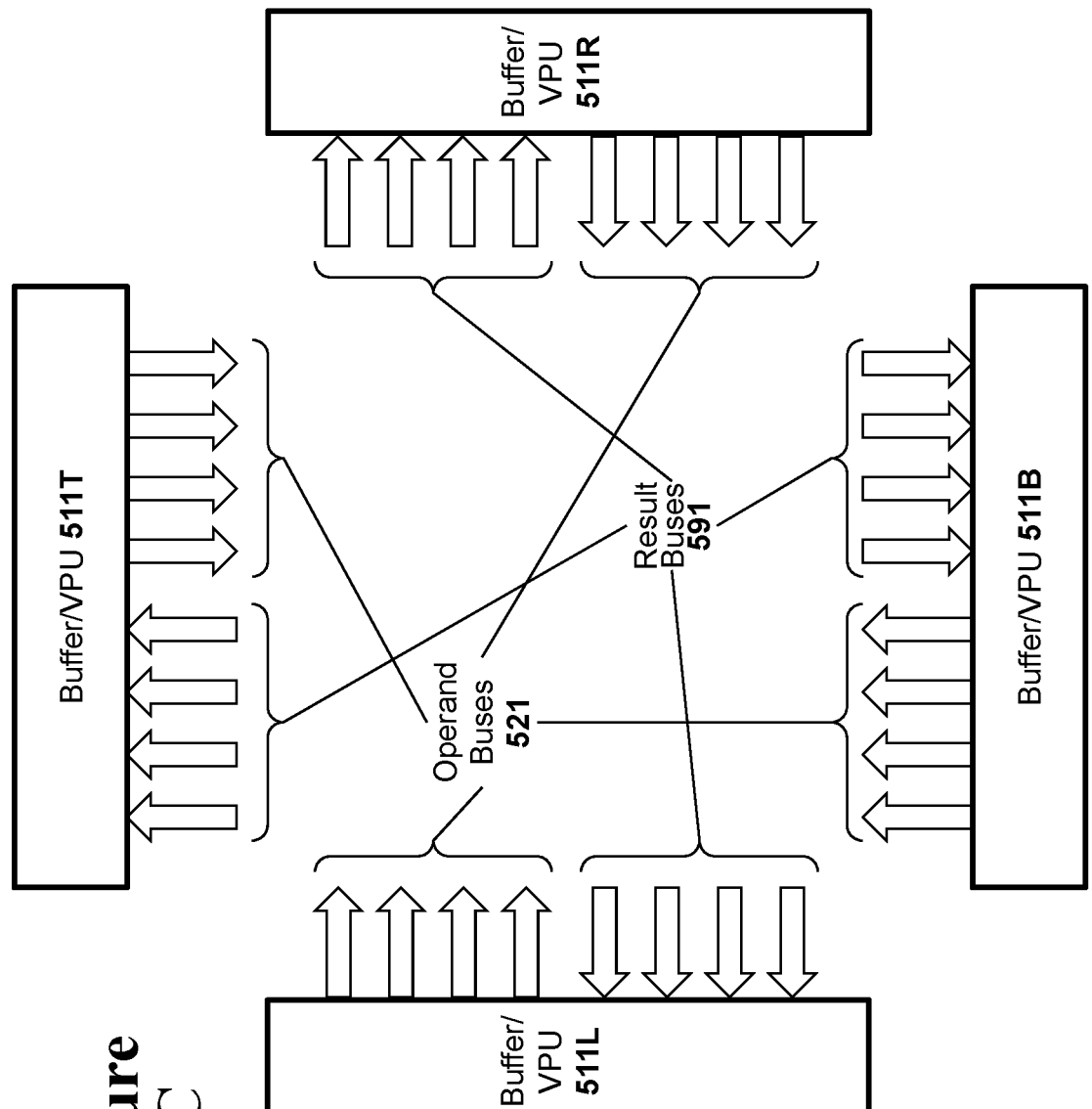

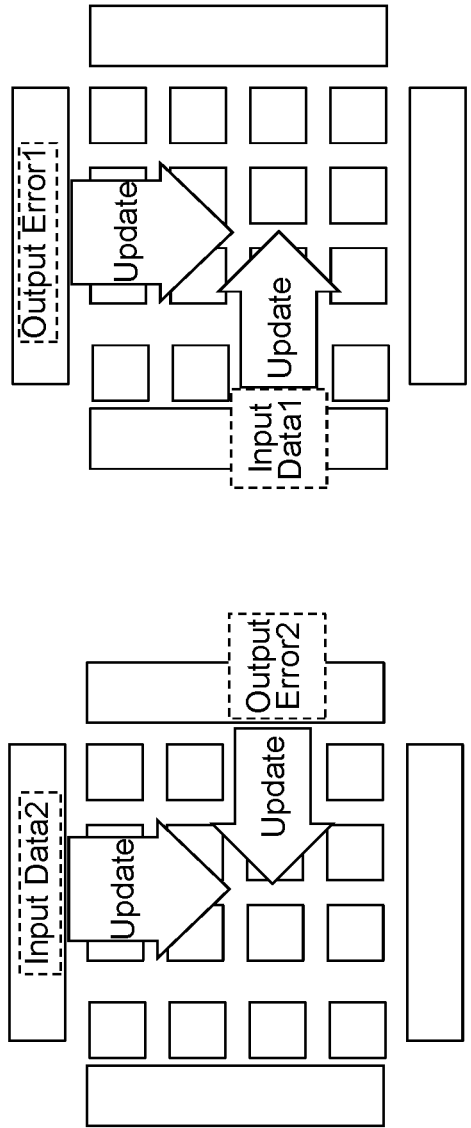

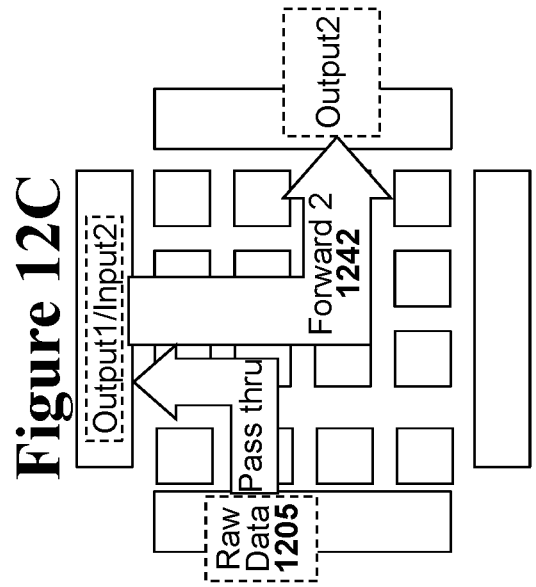
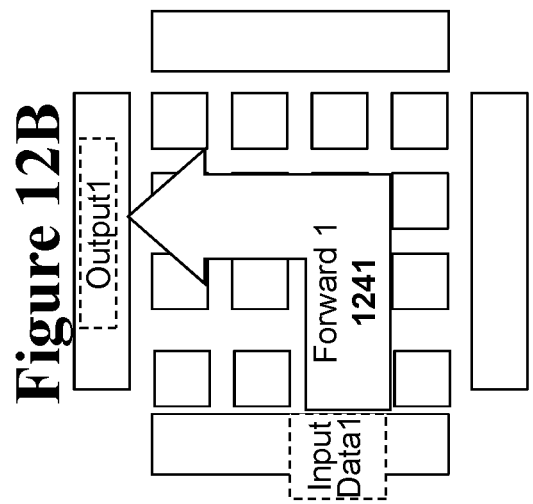

SYSTEMS AND PROCESSES FOR ORGANIZING AND CONTROLLING MULTIPLE MATRIX PROCESSOR CIRCUITS

RELATED APPLICATIONS

The present U.S. patent application claims the benefit of the previous U.S. Provisional Patent Application entitled "Methods And Apparatus For Organizing And Controlling Matrix Operations Circuits" filed on Jan. 11, 2019 having Ser. No. 62/791,585.

TECHNICAL FIELD

The present invention relates to the field of digital processing circuits. In particular, but not by way of limitation, the present invention discloses digital circuit designs, architectures, control systems, and operating modes for digital circuits that perform matrix operations.

BACKGROUND

A conventional computer system uses the well-known traditional Von Neumann computer architecture. The Von Neumann computer architecture generally consists of an input/output unit for moving data into and out of the computer system, a memory system for storing data within the computer system, an Arithmetic and Logic Unit (ALU) for logically processing data, and a control system for controlling the operation of the computer system. The Von Neumann architecture computer system operates by having the control system repetitively move data from the memory system through Arithmetic and Logic Unit (ALU) and then back into the memory system to process the data in a controlled manner. With the traditional Von Neumann computer architecture, a computer system can perform any desired calculation by processing the data with the proper set of processing steps through the arithmetic and logic unit (ALU).

Although the traditional Von Neumann computer architecture is extremely flexible in that the Von Neumann computer architecture can ultimately perform any desired calculation, complex calculations may require extremely large numbers of sequential processing iterations. Specifically, each individual processing iteration step may require reading data from the memory, processing that data within the Arithmetic and Logic Unit (ALU) and then writing the processed output data back to the memory system. Thus, complex calculations requiring extremely large number of sequential processing iteration steps wherein each processing iteration step may comprise several individual sub-steps becomes very time consuming.

To reduce the time required to perform complex calculations, many specialized processors have been developed for handling specialized computing tasks. For example, specialized Digital Signal Processors have been developed for processing signals. Similarly, Graphical Processing Units (GPUs) have been developed for performing specialized three-dimensional computer graphics operations.

One of the fields most in need of specialized processor is the field of Artificial Intelligence (AI). Artificial Intelligence is increasingly being used for a wide variety of complex tasks such as image recognition, High-Performance Computing (HPC), scientific computing, machine learning, data-mining, speech recognition, and self-driving vehicles. Artificial Intelligence applications tend to rely very heavily upon matrix computations. Specifically, matrix operations are required to implement artificial neural networks (ANNs) that learn from a set of training data and then later apply that learning to new input data.

Due to the very heavy usage of matrix computations, artificial intelligence is a very computationally intensive field of computing desperately in need of computational optimizations. One of the most popular techniques is to create specialized digital matrix processing circuits for the performing matrix operations needed to implement an artificial neural network. However, an artificial neural network is more than just a large set of matrix operations. Specifically, the matrix operations must be performed in a specific order and there are critical data dependencies between the matrix operations. Without proper coordination, the specialized matrix processor circuits may end up idle or spending large amounts of time loading in different weight matrix data. Therefore, it is desirable to further develop new techniques for organizing and controlling multiple Matrix Processor circuits efficiently in order to optimize the computational tasks associated with implementing artificial neural networks.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 2A illustrates a block diagram of one embodiment Matrix Processor that may be used to perform matrix calculations.

FIG. 2C illustrates a block diagram of an abstracted Matrix Processor that may be used to perform matrix calculations.

FIG. 3A-2 illustrates one embodiment of the matrix processor array of FIG. 3A-1.

FIG. 4C illustrates an abstracted matrix processor that is specifically designed to operate on a 16 by 16 matrix being used to process 16 data elements with 1 weight from a 4 by 4 matrix.

FIG. 5C illustrates a block diagram of the buffer and vector processor unit support structure for a matrix processor that is connected on all four sides with both operand buses and result buses.

FIG. 10E illustrates a weight update operation for the backward propagation operation of FIG. 10C.

FIG. 10F illustrates a weight update operation for the backward propagation operation of FIG. 10D.

FIG. 12B illustrates a first left to top forward pass operation for the network of FIG. 12A.

FIG. 12C illustrates a data pass thru and a second first top to right forward pass operation for the network of FIG. 12A.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to a specific symmetric Matrix Processor, the techniques may be used with other implementations of a matrix processor circuit. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Neural Networks Overview

One of the core techniques in artificial intelligence (AI) is the use of artificial neural networks (ANNs). Artificial neural networks first learn from training data and then are later used to make logical inferences from new input data. Artificial neural networks were originally designed to be similar to the biological neuron networks in animal brains.

Figure 1A:
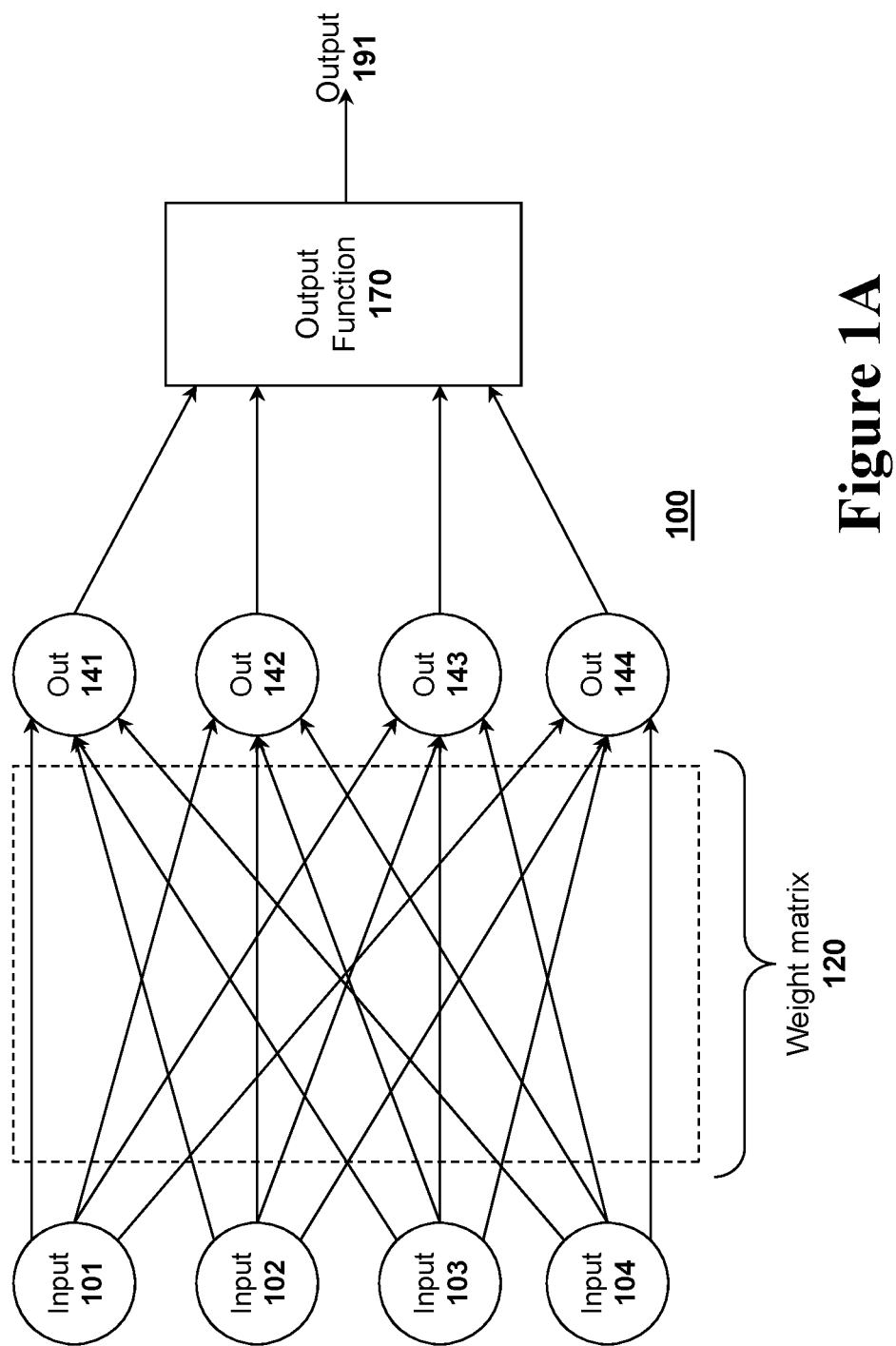
FIG. 1A illustrates a conceptual diagram of a single layer artificial neural network.

FIG. 1A illustrates a conceptual diagram of a single-layer four-input artificial neural network 100. Referring to FIG. 1A, inputs 101 to 104 are provided with training data during training sessions and then with new input data when the artificial neural network is used to make inferences. The input data (101 to 104) are processed with a weighted matrix 120 to create output data (141 to 144). Many different types of data processing may be performed using weighted matrix 120 (such as a Hadamard product, Frobenius inner product, matrix addition, etc.) however this document will focus upon the well-known matrix product. (Note that the techniques described in this document can be used with any of these other data processing operations.)

After processing the input data (101 to 104) with the weighted matrix 120 to create the output data (141 to 144), the output data (141 to 144) may be combined with an output function 170 to create a final output 191 for the artificial neural network 100. The output function 170 may be referred to as an activation function.

Note that the four-input artificial neural network of FIG. 1A illustrates just one example of small an artificial neural network. Artificial neural networks may be constructed much wider than just four inputs. Multiple independent artificial neural networks may be used in parallel and the outputs of the independent artificial neural networks may be combined.

Figure 1B:
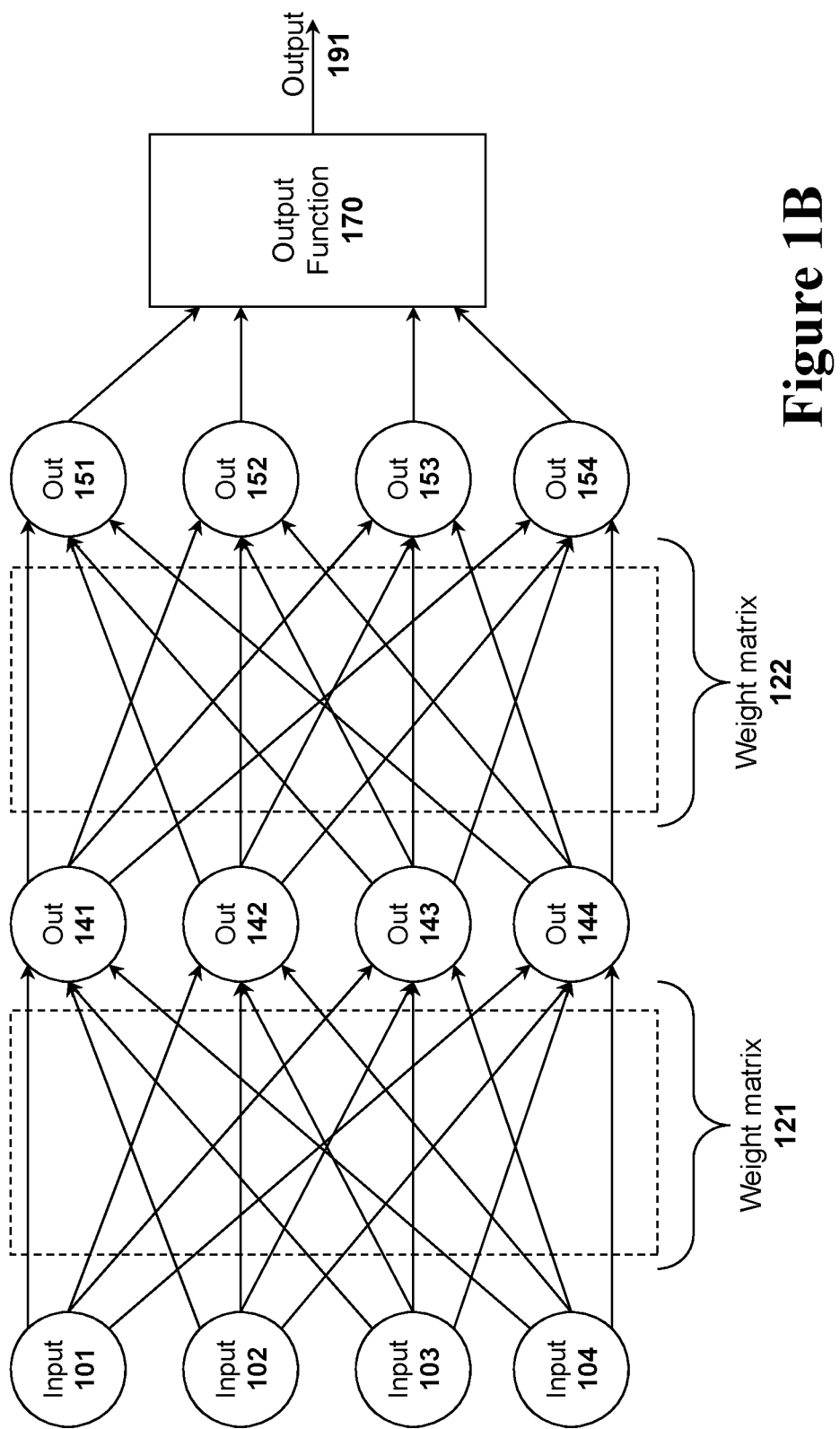
FIG. 1B illustrates a conceptual diagram of a double-layer artificial neural network.

Artificial neural networks may comprise many layers of weight matrices such that very complex analysis of the input data may be performed. For example, FIG. 1B illustrates a two-layer artificial neural network wherein the input data (101 to 104) is processed with a first weighted matrix 121 to create intermediate output data (141 to 144). Next, intermediate output data (141 to 144) is processed with a second weighted matrix 122 to create output data (151 to 154). Output data (151 to 154) may be processed by output function 170 to create a final output. Alternatively (or in addition to), the output data (151 to 154) may also be used as intermediate data that is fed into additional artificial neural network layers (not shown) such that very complex hierarchical artificial neural networks may be created.

Example Matrix Processor

As illustrated with reference to FIGS. 1A and 1B, artificial intelligence relies upon large amounts of computationally intensive matrix operations in order to initially learn using training data and later to draw inferences from a set of new input data. Fortunately, such matrix operations used in artificial neural network allow for many optimizations to be made since there is a significant amount of parallelism in the matrix computational tasks that are required. Thus, many special processors for artificial intelligence applications use a Single Instruction Multiple-Data (SIMD) architecture where wide data vectors are processed with each instruction such that matrix operations can be performed efficiently.

To provide optimal processing for artificial intelligence tasks, specialized Matrix Processor may be used. A Matrix Processor is digital processing circuit that has been designed to help efficiently perform artificial intelligence computational tasks. Specifically, a Matrix Processor is designed in a manner to rapidly read input data vectors, output data vectors, and matrix weight data in parallel format for high throughput. In this manner, the Matrix Processor can be used for forward propagation inferences as well as for backpropagation artificial intelligence learning.

FIG. 2A illustrates a block diagram of one embodiment of a matrix processor 200 that handles a data with six data elements. Note that matrix processors can be made to handle data vectors with many more or fewer data elements in each data vector.

The matrix processor 200 of FIG. 2A has access to a wide State Random Access Memory (SRAM) bank 230 (also referred to herein as wide SRAM, SRAM, memory, and memory system). The wide SRAM 230 is configured such that entire wide rows of data can be accessed in a single memory cycle. In this manner, an entire input vector or an entire row of weight values from a weight matrix can be read out from the SRAM 230 or written to the SRAM 230 in a single memory cycle. The matrix processor 200 also includes an operand register file 210 for storing input data and other data that will be used as operands during computations.

The wide SRAM 230, the operand register file 210, and an operand bus 221 are coupled to a bank of multiplexors 240 that provide operand data to a bank of Multiply And Accumulate (MAC) units 260. A control system 205 controls all of these individual circuit elements to perform the required data vector processing. Thus, control system 205 selects between data stored within the wide SRAM 230, data in the operand register file 210, and data an operand bus 221 to be provided to the Multiply and Accumulate (MAC) units 260 for processing.

Results from the bank of Multiply and Accumulate (MAC) units 260 may be stored in result register file 250. These output results may be distributed in raw form in parallel using result bus 291. Alternatively (or in addition to the raw output data), the results in the result register file 250 may be combined with reduction tree 270 to provide a single output on reduce bus 295.

Note that for some operations the results stored in the result register file 250 may be used as an operand in another calculation. To handle this such calculations, there are data paths from the result register file 250 back to bank of Multiply And Accumulate (MAC) units 260. Control system 205 is used to control exactly how the Multiply and Accumulate (MAC) units 260 will select the data to be processed and how the data is processed.

Figure 2B:
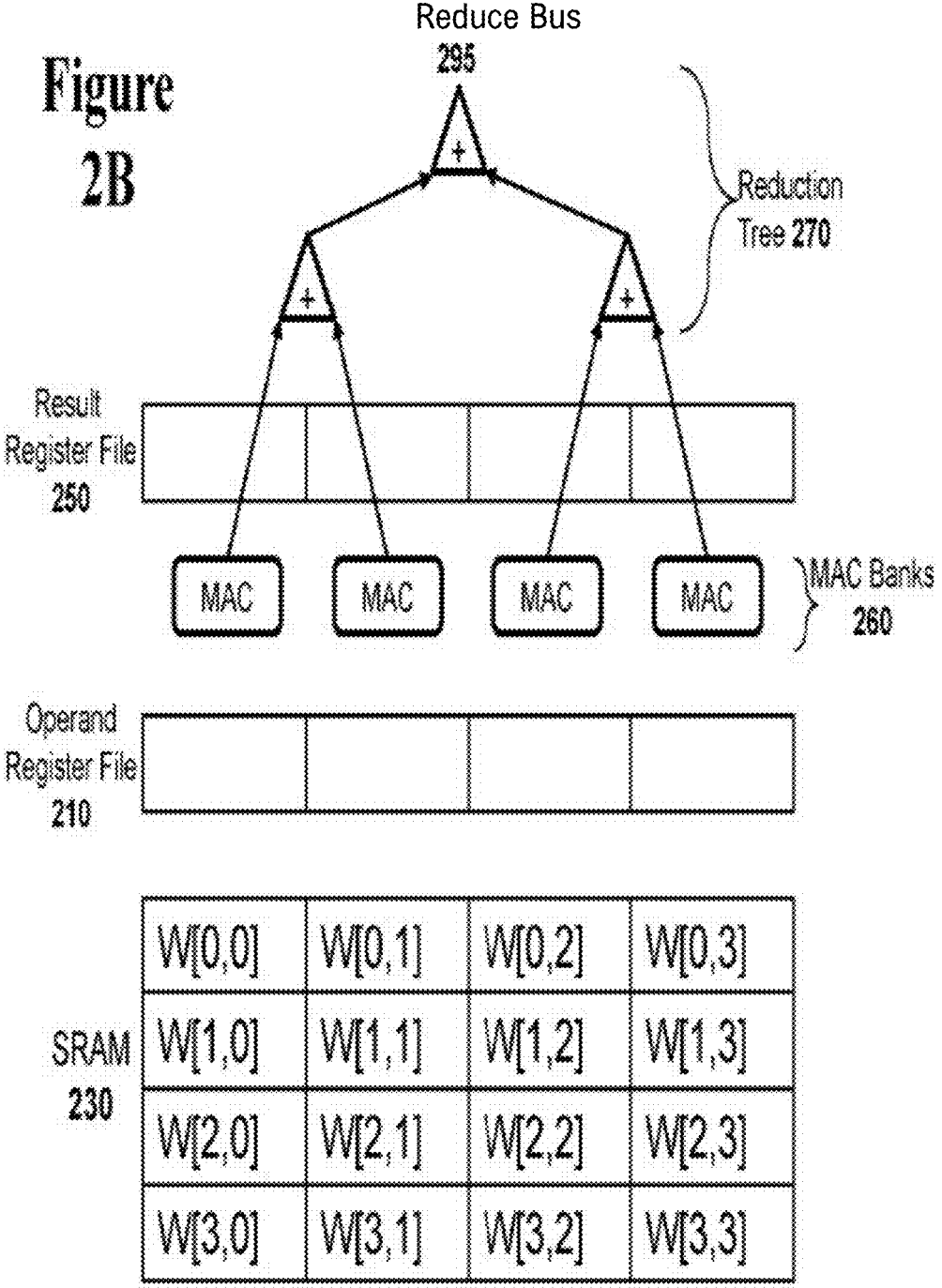
FIG. 2B illustrates a conceptual diagram of the Matrix Processor of FIG. 2A with a four-by-four weight matrix consisting of sixteen weight value elements W[0,0] to W[3,3] stored within the wide SRAM memory system.

FIG. 2B illustrates how a four by four weight matrix consisting of elements W[0,0] to W[3,3] is stored within the wide SRAM 230. The weight values in the weight matrix are stored in alignment with the underlying SRAM memory's row structure such that entire rows of weight values can be read out in a single memory cycle. For example, weight values W[0,0], W[0,1], W[0,2], and W[0,3] can be read out of SRAM 230 in a single memory cycle and provided simultaneously to the individual Multiply And Accumulate (MAC) units 260 in the MAC bank in parallel. The other operands for a computation may come from the operand register file 210 or from the operand bus (not shown in FIG. 2B).

The matrix processor 200 of FIGS. 2A and 2B illustrates only one possible embodiment of a matrix processor unit. Details of the matrix processor 200 of FIGS. 2A and 2B can be found in the U.S. patent application Ser. No. 16/149,054 and titled "Methods and Apparatus for Constructing Digital Circuits for Performing Matrix Operations" which is hereby incorporated by reference. However, matrix processors can be implemented in many different manners and in many different sizes.

Abstracted Matrix Processor

Matrix processors can be implemented in many different sizes and in many different manners. This document will primarily concern combining multiple different matrix processor circuits in efficient manners that can perform a wide variety of matrix operations. Thus, to simplify this disclosure an abstracted matrix processor will be discussed.

FIG. 2C illustrates a first block diagram of an abstracted matrix processor 201. The abstracted matrix processor 201 receives input data on one or more operand buses. In the particular embodiment of FIG. 2C, there are two operand buses: operand bus from the top 221T and operand bus 221L from the left. Data received on the operand buses may be used directly by the processing logic 267 or may be stored in memory 230 for later usage. The data received may comprise entire weight matrices and input data operand vectors. The memory system 230 may also include register files closely coupled to the processing logic 267.

The matrix processor 201 also receives commands on command bus 207. The control system 205 within the matrix processor 201 parses the commands received and uses the commands to determine how the processing logic 267 will be used to process data. The processing logic 267 may be implemented in many different manners as long as the matrix processor 201 performs the desired matrix operations and outputs the proper matrix operation results. For example, the processing logic 267 may be implemented with a single-instruction multiple-data (SIMD) processor, a digital signal processor (DSP), a conventional central processing unit (CPU) core, a highly parallelized specialized matrix processor 200 as illustrated in FIGS. 2A and 2B, or in any other manner that performs the desired matrix operations.

The matrix processor 201 may be designed to operate using many different types of data formats and data precision levels. For example, the matrix processor 201 may process integers, 16-bit floating point numbers, 32-bit floating point numbers, or any other data format.

Many different matrix operations may be implemented in the abstracted matrix processor 201. Two well-known matrix operations that may be included are the matrix dot product and the matrix cross products.

The control system 205 instructs the processing logic 267 to output the results of requested matrix operations on one or more result bus 291. In some embodiments, the matrix processor 201 will include the reduction logic output a reduced form of the result on a reduce bus 295.

The operand buses are wide parallel buses such that entire input data vectors can be loaded in a single cycle. Similarly, entire weight matrix rows from a weight matrix may be read into the matrix processor 201 in a single cycle. Similarly, the result buses 291 are also wide parallel buses such that entire output data vectors can be output in a single cycle.

The memory system 230 is very important component of the abstracted matrix processor 201. To optimize performance, the memory system 230 of the matrix processor 201 is both wide and deep.

The memory system 230 is wide in that entire data vectors can be written into or read out of the memory system 230 in a single cycle. For example, in Matrix Processor that handles a 16 by 16 element matrix wherein each element is a 16-bit floating-point value, the memory system can read out 256 bit values such that entire sixteen element data vectors of 16-bits each can be read out of the memory system 230 in a single cycle.

The memory system 230 is deep in that it is constructed large enough to store multiple different sets of weight matrices. In this manner the matrix processor 201 can be used to perform matrix operations on multiple different artificial neural network layers. For example, if a matrix processor 201 cannot perform an operation for one particular neural network layer because a required input data vector is not yet available, that matrix processor can instead be used to perform matrix operations for other neural network layers or other neural networks. A deep memory 230 allows the matrix processor 201 to be used very efficiently since it can handle a steady stream of requested matrix operations for many different neural networks without ever needing to load in weight matrix data, one of the most time consuming (and energy consuming) tasks for matrix processing.

In addition to storing multiple weight matrices, the memory 230 can be used to store other information that may be needed such as input data vectors, output data vectors, error vectors, etc. Intermediate result data vectors from forward pass operations may be stored in the memory system 230 and then later accessed when performing a related back propagation operation. Another very important type of data that may be stored is matrix weight gradients. A matrix weight gradient comprises a matrix of adjustments for a weight matrix that may be periodically used to update the weight matrix.

Combining Matrix Processors into an Array

The abstracted matrix processor 201 illustrated in FIG. 2C can be used alone to perform simple matrix operations very quickly. For example, the matrix processor 201 can be used to implement the very small artificial neural network 100 illustrated in FIG. 1A. It could also be used to implement the small two-layer artificial neural network illustrated in FIG. 1B by using it serially to perform the required matrix operations of both artificial neural network layers.

However, most artificial neural networks must handle many more inputs and outputs than the very small example artificial neural networks illustrated in FIGS. 1A and 1B. It is therefore desirable to combine together the computing ability of many different matrix processors in order process wider artificial neural networks and multi-layer artificial neural networks. In this manner, much larger multi-layer artificial neural networks that are used to perform useful artificial intelligence tasks can be handled very efficiently.

Figures 1, 3A:
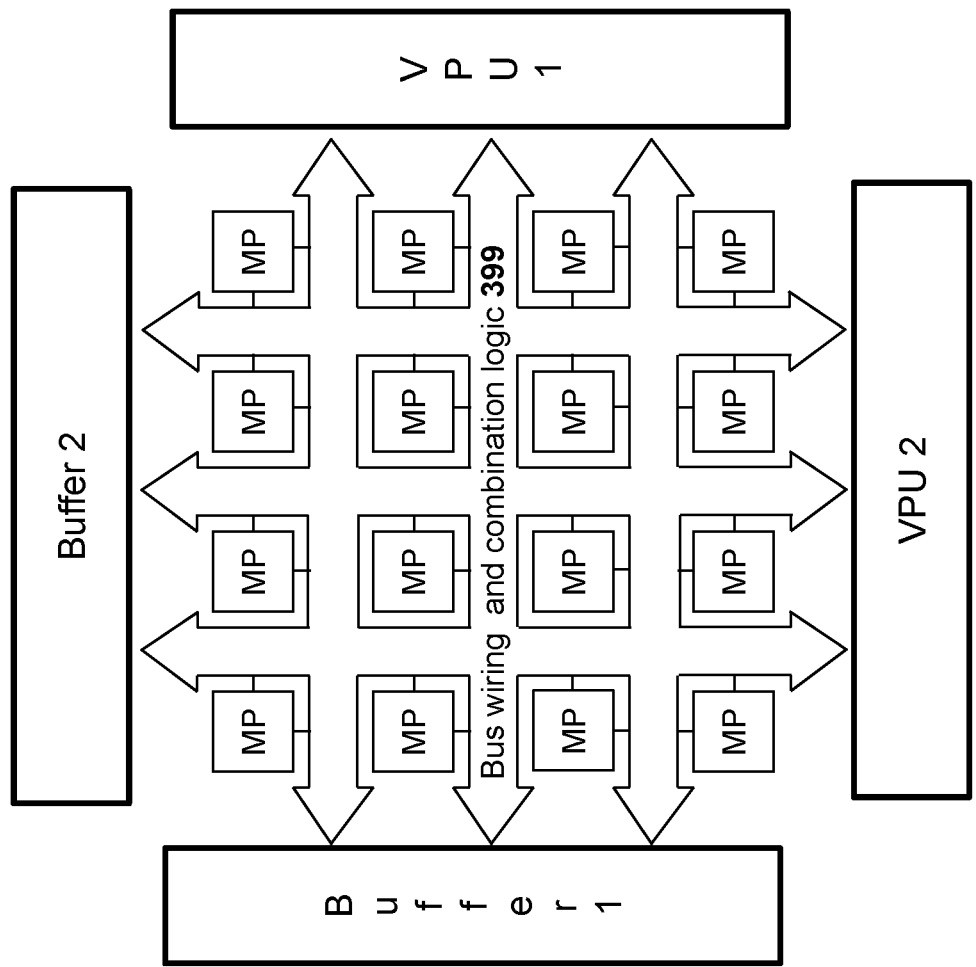
FIG. 3A-1 illustrates a block diagram of an array of Matrix Processors surrounded by buffers on two sides and vector processors on two sides.

FIG. 3A-1 illustrates a block diagram of a first embodiment of an architecture using multiple Matrix Processor circuits in a coordinated matter to implement wide multi-layer artificial neural networks. In FIG. 3A-1, each individual Matrix Processor is labelled as "MP" for Matrix Processor. As illustrated in FIG. 3A-1, the Matrix Processors are arranged in a grid format. In between the individual matrix processors of the matrix processor array is bus wiring and combination logic 399 that couples all of the matrix processors to buffers that provide input data and vector processing units (VPU) that receive result data vectors and further process those result data vectors. The bus wiring and combination logic 399 may be implemented in different manners to achieve different goals.

Figures 2, 3A:
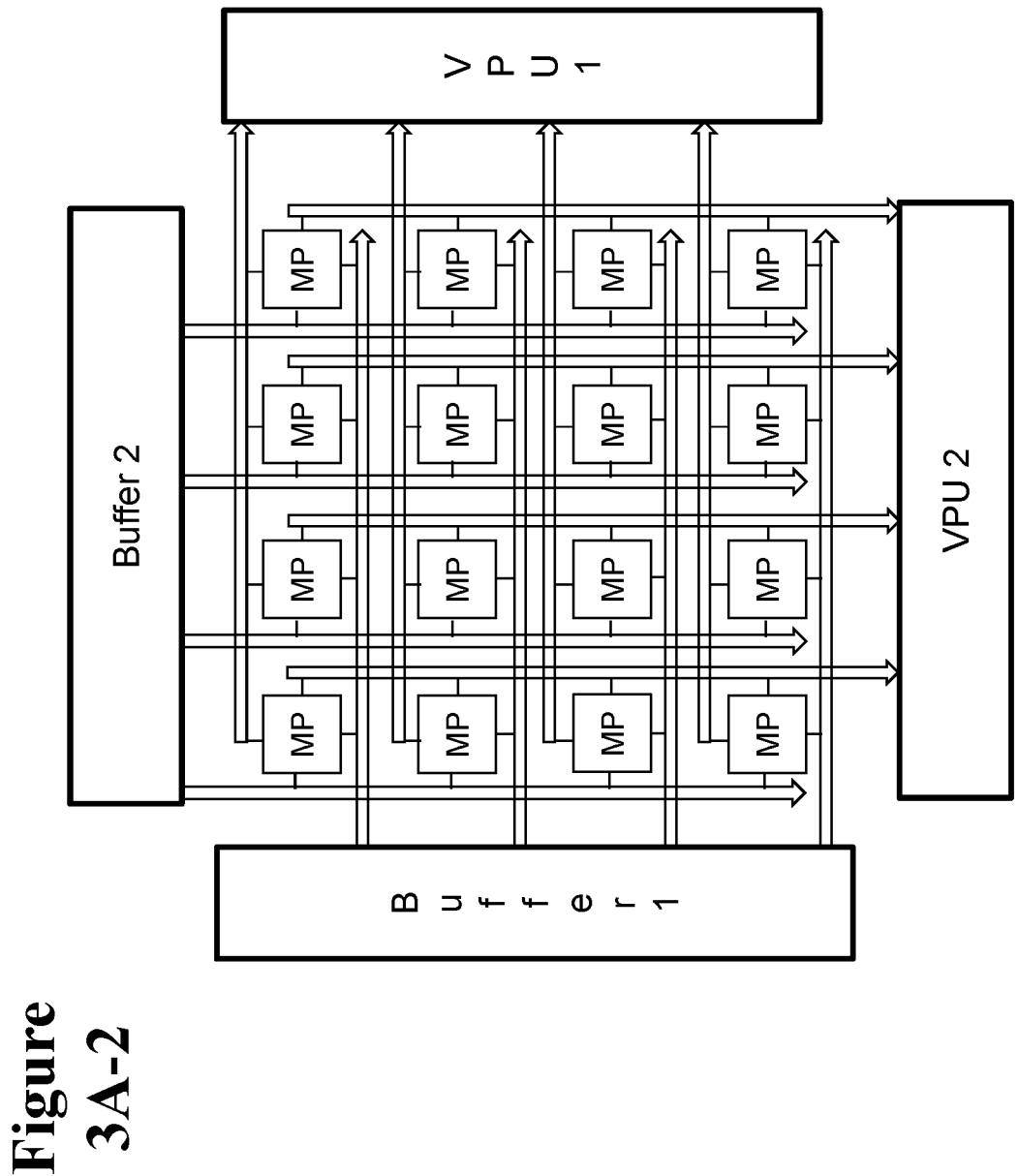

To provide data vectors to the array of matrix processors in one embodiment, Buffer 1 on left and Buffer 2 on the top are coupled to the operand bus of every individual matrix processor in the bus wiring and combination logic 399. This may be accomplished by coupling operand bus 221L to Buffer 1 and operand bus 221T to Buffer 2 as illustrated in FIG. 3A-2. In this manner, data vectors from either Buffer 1 or Buffer 2 can be loaded into the matrix processors in the array. The data vectors may comprise weight matrix rows, input data vectors, or any other required data. Note that since there are multiple buses, the operand loading operations can be performed in parallel.

Similarly, the result bus of every matrix processor in the array is coupled to Vector Processing Unit 1 (VPU1) on the right and Vector Processing Unit 2 (VPU2) on the bottom of the array using bus wiring and combination logic 399. This may be accomplished by coupling result bus 291R to Vector Processing Unit 1 (VPU1) on the right and result bus 291B to Vector Processing Unit 2 (VPU2) on the bottom as illustrated in FIG. 3A-2. The Vector Processing Units contain both storage for storing result data vectors and processing logic for performing various vector processing operations on received result data vectors. For example, the Vector Processing Units (VPUs) can combine partial result data vectors from multiple different Matrix Processors into a single complete output data vector result.

All of the individual Matrix processors in the array receive commands on their individual command buses 207 (not shown in FIG. 3A-2). In this manner, each individual Matrix Processor in the array can be controlled individually. For example, the individual Matrix Processors can be informed when data is available on their operand buses and what operations to perform. By carefully controlling each individual matrix processor of the array in a coordinated manner, the matrix processor array becomes a very powerful system for efficiently processing matrix operations needed for artificial intelligence applications.

Pipeline Mode Matrix Processor Array Processing

The first embodiment of a Matrix Processor array as illustrated in FIGS. 3A-1 and 3A-2 can be used operate in a coordinated manner to efficiently perform multiple matrix operations to implement an artificial neural network. To pipeline matrix operations, the Matrix Processor array embodiment illustrated in FIGS. 3A-1 and 3A-2 may be operated in a left-to right manner or a top-to-bottom manner.

Figure 3B:
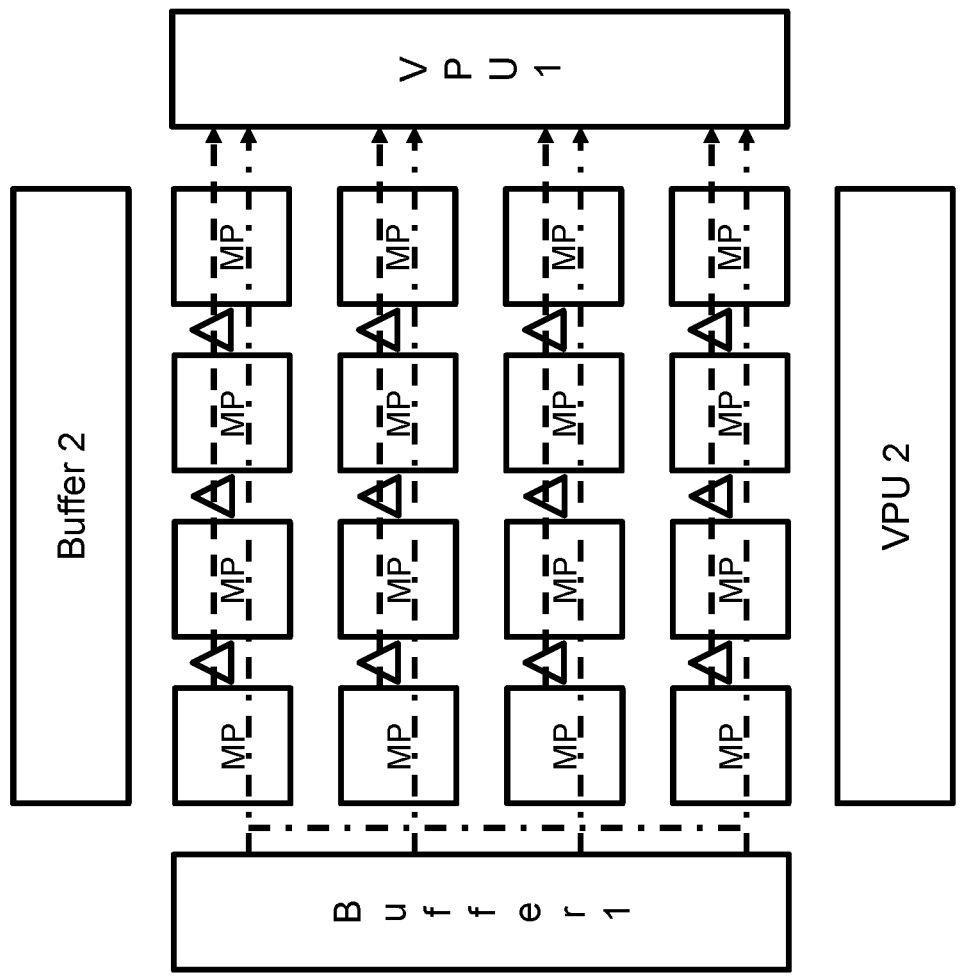
FIG. 3B illustrates the block diagram of the array of Matrix Processors of FIG. 3A-2 being operated in a left-to-right manner.

For example, FIG. 3B illustrates the Matrix Processor Array used in a left-to right manner where in the individual columns of Matrix Processors may be used to implement multiple layers of an artificial neural network. Alternatively, the successive columns may be used to compute partial results of a matrix operation that are then combined together into a final result.

Referring to FIG. 3B, the operand bus 221L from Buffer 1 is illustrated as a dash-dot line. Operand bus 221L allows Buffer 1 to load operand input data vectors into the individual matrix processors in the matrix processor array. Weight matrices are first loaded into the individual matrix processors one row at a time. Once loaded, the weight matrices may be used for many matrix operations. For each matrix operation using external data, an input data vector is placed on the operand bus 221L.

After each processing event, each matrix processor may output data on its result bus 291R illustrated as a dash line in FIG. 3B. Output data is sent from Matrix Processors on result bus 291R to Vector Processing unit 1 (VPU1). For some operations, the output data vector placed on the result bus 291R may be a partial result. The triangle represents the combination logic that may be used to merge such partial results data in sequential, tree, or other manner to create a combined result. For example, the combination logic may be adders that combine partial results into a full result.

Figure 3C:
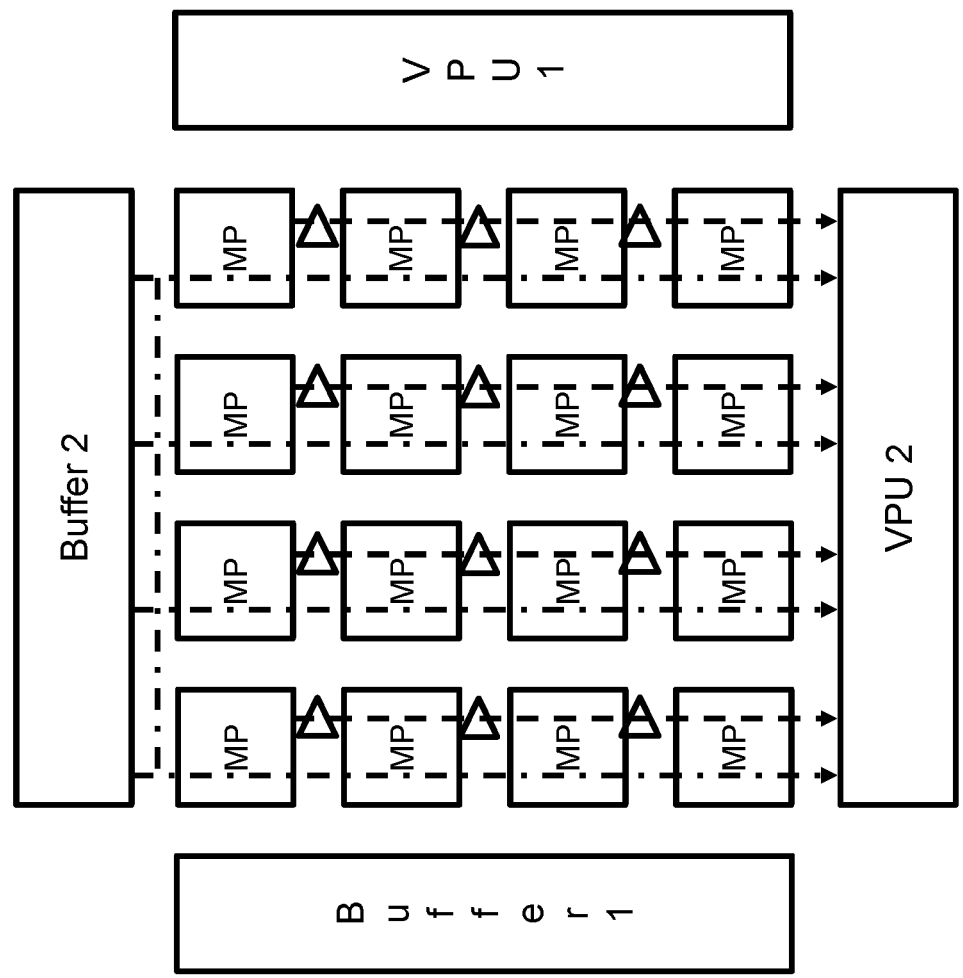
FIG. 3C illustrates the block diagram of the array of Matrix Processors of FIG. 3A-2 being operated in a top-to-down manner.

FIG. 3C illustrates the first embodiment matrix processor array operated in a top-to-bottom manner. Specifically, FIG. 3C illustrates the matrix processor array wherein the Operand Bus is illustrated as a dash-dot line that allows Buffer 2 to load operand input data vectors into the individual matrix processors in the array. Correspondingly, after each processing event, each matrix processor may output data on its Result Bus illustrated as a dash line extending downwards towards Vector Processing unit 2 in FIG. 3C.

Orthogonal Mode Matrix Processor Array Processing

In addition to the pipeline mode illustrated in FIGS. 3B and 3C Matrix Processor array illustrated of FIG. 3A can also be operated in an orthogonal manner. Specifically, the matrix processor array may be operated in a top-to-right manner or right-to-bottom manner wherein the result data vectors are output 90 degrees From the input data vectors. The orthogonal operating mode maps very well onto the matrix multiplication operations that are very critical to artificial intelligence applications such that it is one of the most important operating modes. Specifically, the orthogonal processing system can be more efficient for partial sum reductions.

Figure 3D:
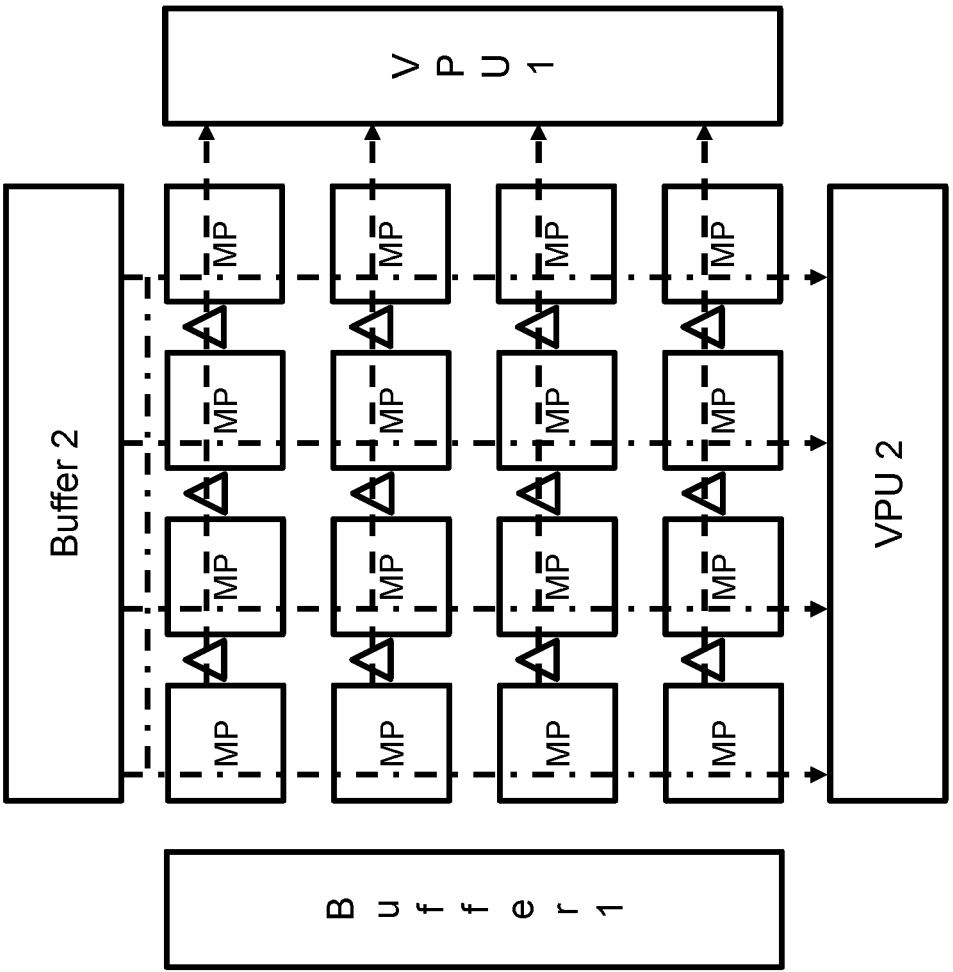
FIG. 3D illustrates the block diagram of the array of Matrix Processors of FIG. 3A-2 being operated in a top-to-right manner.

FIG. 3D illustrates the Matrix Processor array wherein the operand bus 221T is illustrated as a dash-dot line that allows Buffer 2 to load operand input data vectors from the top into the individual matrix processors in the array. After each processing event, each Matrix Processor may output data on its result bus 291R illustrated as a dash line extending rightward towards Vector Processing unit 1 (VPU1). Note that the triangle represents combination logic that can combine partial results.

Figure 3E:
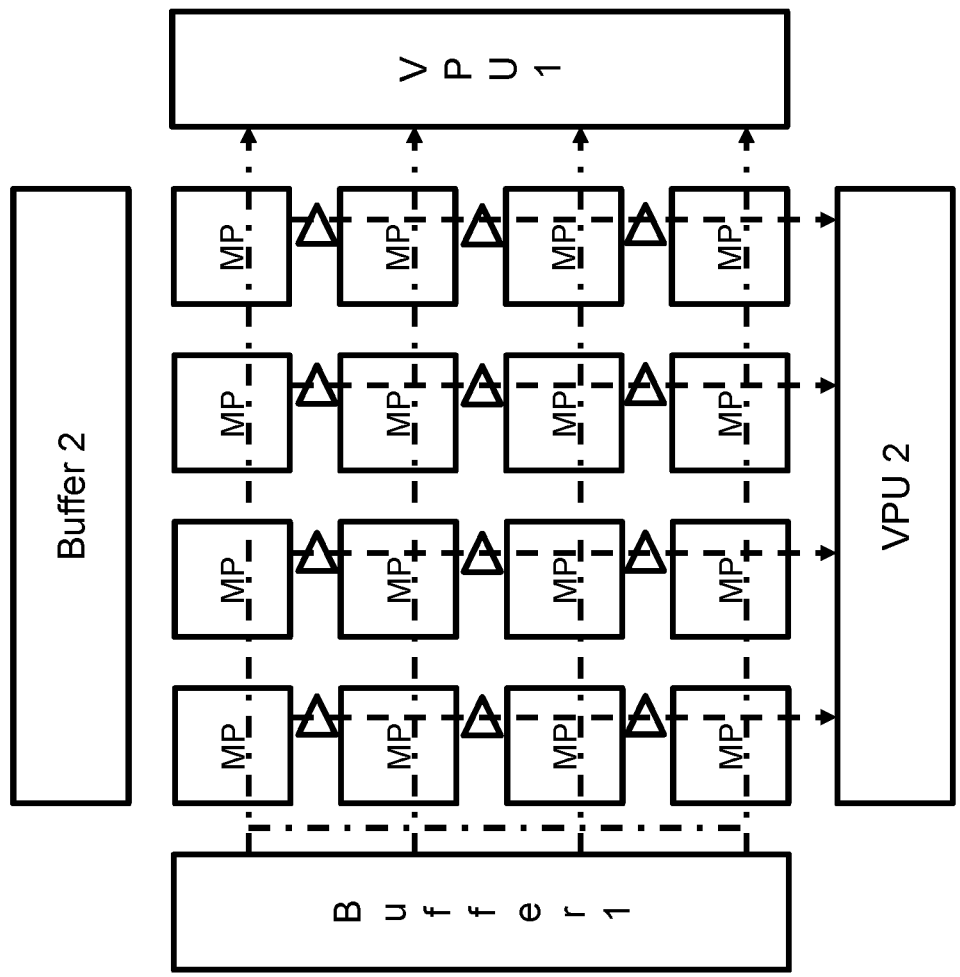
FIG. 3E illustrates the block diagram of the array of Matrix Processors of FIG. 3A-2 being operated in a left-to-bottom manner.

FIG. 3E illustrates the Matrix Processor array wherein the operand bus 221L is illustrated as a dash-dot line that allows Buffer 1 to load operand input data vectors from the left into the individual matrix processors in the matrix processor array. After each processing event, each Matrix Processor may output data on its result bus 291B illustrated as a dash line extending rightward towards Vector Processing unit 2 (VPU2).

Matrix Processor Array Processing Examples

The Matrix Processor array illustrated in FIGS. 3A to 3E can be used to efficiently implement an artificial neural network. Specifically, the Matrix Processor array illustrated in FIGS. 3A to 3E can perform the common forward pass (inference), backward propagation (error calculation), and weight update (learning) operations that are the main operations used to create and use an artificial neural network. An example of each of these common artificial intelligence operations will be described using FIGS. 3D, 3E, and 3F.

Referring to FIG. 3D, before performing forward pass operations, the needed weight matrix data must be loaded into the Matrix Processors. This can be performed by loading in entire rows of the weight matrix from a Buffer one at time until the full weight matrix has been loaded. Note that once a weight matrix has been loaded, it can be used over and over for forward pass inference operations and backward propagation operations without reloading the data. Furthermore, after backward propagation operations to calculate errors in the model, the weight matrix can be updated in place.

The first step to perform a forward pass operation is to load input data vectors from the Buffer using the operand bus depicted as a dot-dash line as depicted in FIG. 3D. The Matrix Processors in the array are then instructed using the command bus to each compute partial sums. Next, the partial sums are sent over on result bus depicted as a dashed line. Depending on how the matrix processor array has been configured for operation, the system may reduce the data movement by using local reduction.

The Vector Processing Unit 1 (VPU1) will accumulate all these partial sums. The Vector Processing Unit 1 (VPU1) will use any activation function or pooling function on accumulated results as required to generate a final result for the forward pass (inference) operation.

FIG. 3E illustrates how a back propagation (error calculation) operation may be performed using the Matrix Processor array. A back propagation operation takes an output error vector and processes it to determine an input error vector. Note that a back propagation operation operates on a transposed version of the weight matrix. Instead of actually transposing a weight matrix, the back propagation operation may be performed a direction orthogonal to the forward pass operation thereby achieving the same result. Specifically, since the forward pass operation depicted in FIG. 3D was top-to-right, the back propagation operation will be performed left-to-bottom.

Referring to FIG. 3E, the output error vectors are placed on operand bus 221L from Buffer 1 at the left. The command bus coupled to the Matrix Processors is then used to request the Matrix processor to compute partial input errors. The partial input errors will be sent over result bus 291B toward Vector Processing Unit 2 (VPU2) at the bottom. These partial input error vectors can be reduced on their way to Vector Processing Unit 2 (VPU2) using reduction logic depicted as triangles. The Vector Processing Unit 2 (VPU2) may perform additional processing on input error vectors as needed.

The input error vectors calculated by the back propagation operation described in the previous paragraph are used in the third very important matrix operation for artificial neural networks: weight matrix updates. Specifically, the output error vectors and input error vectors are used to calculate data that will be used to adjust the matrix weight values stored in each matrix processor. Adjustments may be performed directly or accumulated into a gradient matrix that is then periodically used to adjust the weight matrix.

Figure 3F:
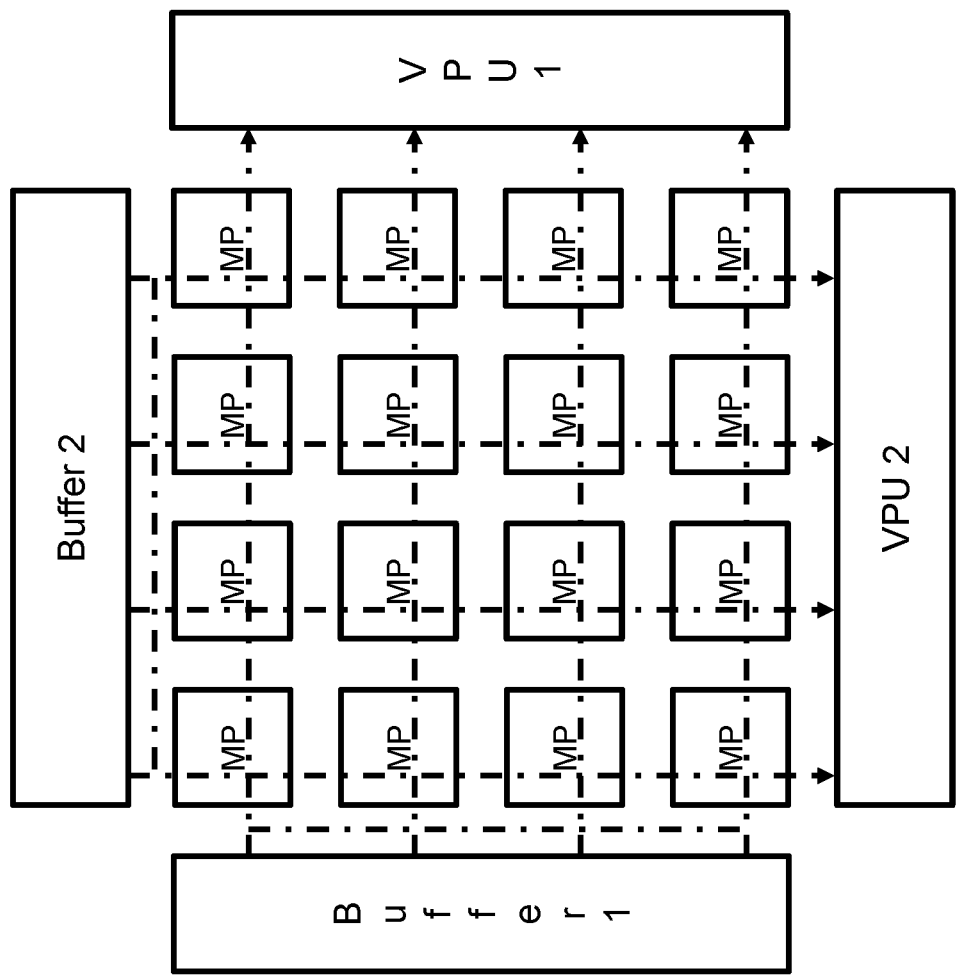
FIG. 3F illustrates the block diagram of the array of Matrix Processors of FIG. 3A-2 updating weight matrices in each Matrix Processor by receiving two data vectors.

As set forth above, weight matrix update operations require both output error vectors and input error vectors to be provided to each matrix processor. FIG. 3F illustrates how the weight matrix values in the Matrix Processor array can be updated using both the left Buffer 1 and the top Buffer 2 to quickly load the two sets of data vectors required for the weight matrix update. Referring to FIG. 3E, the output error vectors may be loaded on operand bus in top-to-bottom direction and then the input error vectors are loaded on left-to-right direction of operand bus. This may be performed in a single cycle since there are independent buses available for loading these two data vectors.

After loading the two required data vectors, the individual matrix processors are then commanded via the command bus to perform updates to the weight matrix. Note that updating the weight matrices within each matrix processor minimizes the time and energy required to perform the updates.

Many variations of weight matrix update formulas may be used. For example, the weight matrix updates may use complex algorithms like ADAM, ADAGRAD, etc. Furthermore, the system may make a local copy of a weight matrix before applying updates such that multiple versions of weight matrices may be kept.

Mapping Matrix Weights into Matrix Processor Array

An individual matrix processor 201 (as illustrated in FIG. 2C) can only quickly perform matrix operations on a matrix of a size that it has been designed to operate on or smaller. A slightly smaller matrix can be handled by zeroing out extra rows & columns that go beyond the small matrix. An individual matrix processor can handle larger matrix by serially computing partial results of a larger matrix operation and then combining those partial results.

The matrix processor array of FIGS. 3A to 3E allows for matrix operations of many different sizes to be efficiently handled. A key aspect is how the individual weights from a weight matrix are distributed among the different matrix processors in the matrix processor array and how the matrix processors are coordinated in their operation. The following sections will describe how the weight matrices may be distributed among matrix processors and how the matrix processor operations are coordinated to efficiently handle almost any size of matrix operation.

Figure 4A:
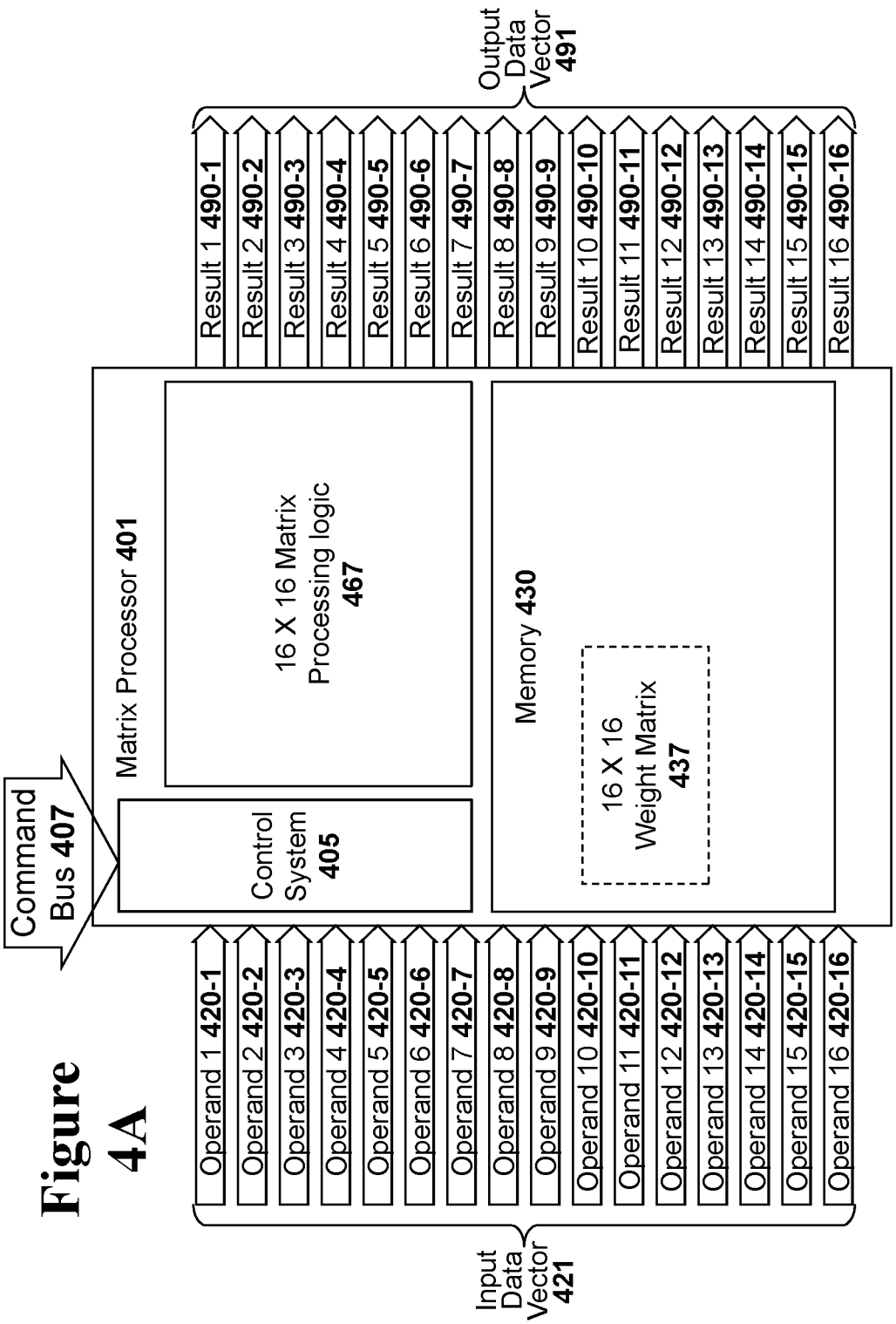
FIG. 4A illustrates an abstracted matrix processor that is specifically designed to operate on a 16 by 16 matrix being used to process a 16 by 16 matrix.

First, the base case will be disclosed. FIG. 4A illustrates an abstracted matrix processor 401 that is specifically designed to operate on a 16 by 16 matrix. That matrix processor 401 stores a 16 by 16 weight matrix 437 in the memory 430. The matrix processor 401 includes 16 by 16 matrix processing logic 467 for performing a variety of matrix operations on a 16 by 16 matrix.

To perform a 16 by 16 matrix operation such as a matrix and vector multiplication, an input data vector 421 consisting of sixteen operands (420-1 to 420-16) is received on operand bus, multiplied by the weight matrix 437, and output as an output data vector 491 consisting of sixteen result values (490-1 to 490-16).

When the 16 by 16 matrix processor 401 is placed in the 4 by 4 matrix processor array of FIGS. 3A to 3E, the system can efficiently process sixteen different 16 by 16 matrix processor operations simultaneously. A control system 405 will provide commands to each individual matrix processor on their individual command bus 407 as to when to load in input data vectors and from which bus; and when to output result data vectors and on which result bus.

The 16 by 16 matrix processor 401 in the 4 by 4 matrix processor array can also easily handle slightly smaller matrix operations by zero out weight matrix values. For example, if a 14 by 14 matrix operation needs to be handled then the last two columns and the last two rows of the matrix operation can be filled with zeros. The next two sections describe how much smaller matrix operations can be handled and how much larger matrix operations can be handled.

Mapping Smaller Matrixes into Matrix Processor Array

When a needed matrix operation is significantly smaller than the matrix operation a particular matrix process is designed to natively handle, it could be handled by zeroing out extra rows & columns that go beyond the small matrix. However, this is a waste of the matrix processing logic and should be avoided if possible. Instead, each individual matrix processor can be configured to process multiple matrix operations simultaneously.

Figure 4B:
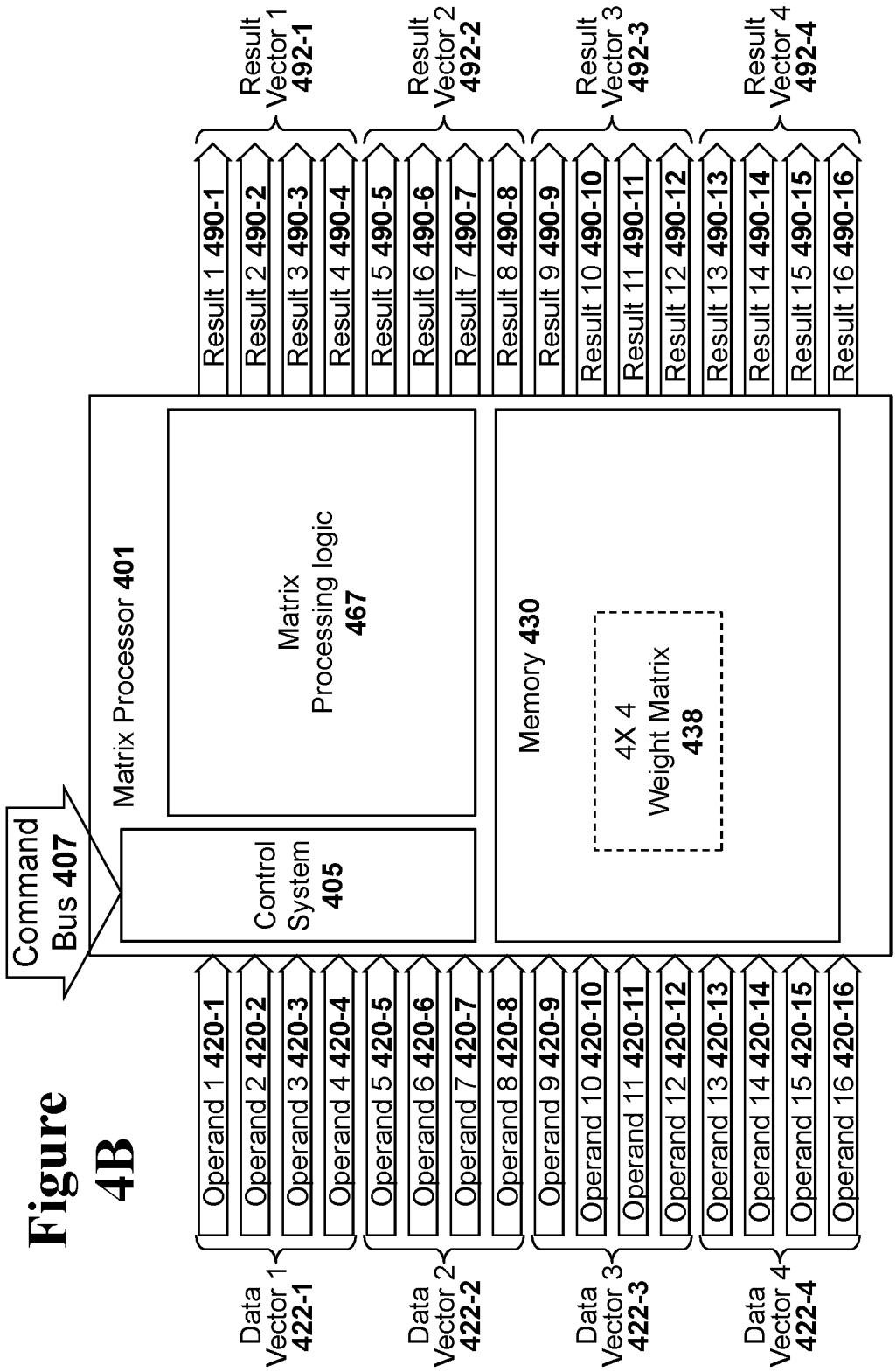
FIG. 4B illustrates an abstracted matrix processor that is specifically designed to operate on a 16 by 16 matrix being used to process four sets of a 4 by 4 matrix.

For example, FIG. 4B illustrates a matrix processor 401 that is specifically designed to operate on a 16 by 16 matrix but has instead been loaded with a 4 by 4 weight matrix 438. To efficiently handle the 4 by 4 matrix operations, four different input data vectors 422-1 to 422-4 may be simultaneously sent to the matrix processor 401 using four groups of four in the sixteen operands (420-1 to 420-16). The matrix processor is then instructed to perform four simultaneous 4 by 4 matrix processing operations that do not interfere with each other. (Note that this will require some additional logic in the matrix processing logic 467 beyond just the 16 by 16 processing logic.) To efficiently perform this operation, there should probably be four copies of the 4 by 4 weight matrix such that 4 copies of a matrix row can be read out out the memory 430 at once. The results from the four simultaneous matrix operations can be output on as result data vectors 492-1 to 492-4 may be simultaneous sent out using four groups of four elements from the sixteen result buses (490-1 to 490-16).

Within the context of a 4 by 4 matrix processor array of FIGS. 3A to 3E a full 64 simultaneous 4 by 4 matrix operations can be performed. Specifically, four different 4 by 4 matrix operations in each of the sixteen matrix processors in the matrix processor array.

The matrix processor array can be operated in multiple different ways to accomplish the same result. For example, referring to FIGS. 3D and 4C, a single weight value from a 4 by 4 weight matrix may be sent to each of the matrix processors 401 in the 4 by 4 matrix processor array. In this manner, each individual matrix processor could receive data elements from sixteen data vectors on the sixteen operand buses (420-1 to 420-16), perform 16 different multiplication operations simultaneously, output the sixteen results with the sixteen result buses (490-1 to 490-16), then combine the results from the sixteen operations with the results from the matrix processors of the same row to create sixteen partial result elements for that row. With all four rows of matrix processors performing the same operation, the sixteen partial result elements from each row are combined by the Vector Processing Unit 1 (VPU1) to create sixteen output data vectors.

Mapping Larger Matrixes into Matrix Processor Array

When a needed matrix operation is larger than a particular matrix processor is designed to natively handle, the matrix processor array is used to combine the processing power of multiple matrix processors to operate in parallel in order to perform the large matrix operation. Individual matrix processor calculates partial results and the partial results calculated simultaneously are then combined to create a full result for the large matrix operation.

Figure 4D:
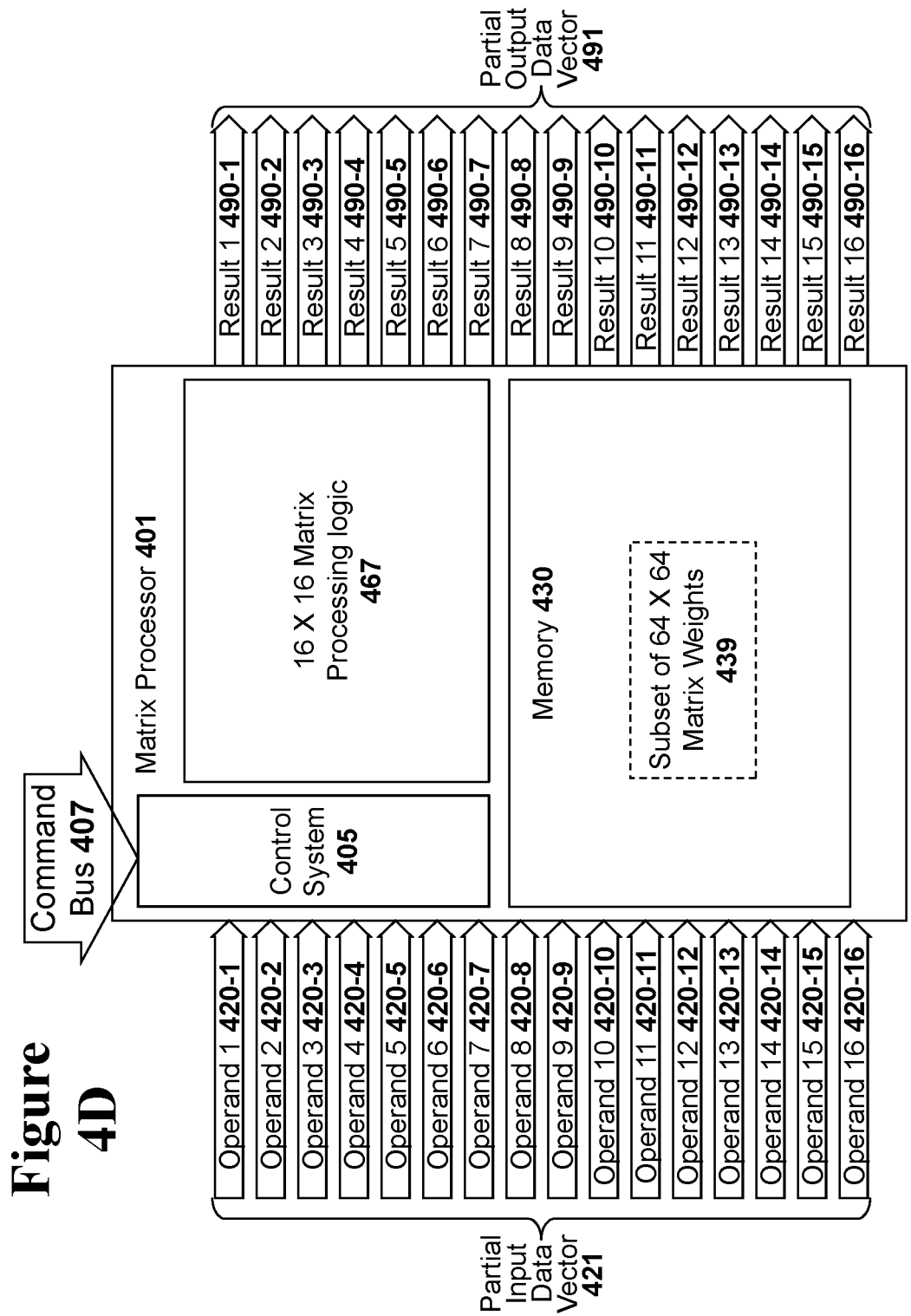
FIG. 4D illustrates an abstracted matrix processor that is specifically designed to operate on a 16 by 16 matrix being used to process a subset of a 64 by 64 matrix to create a partial result.
Figure 4E:
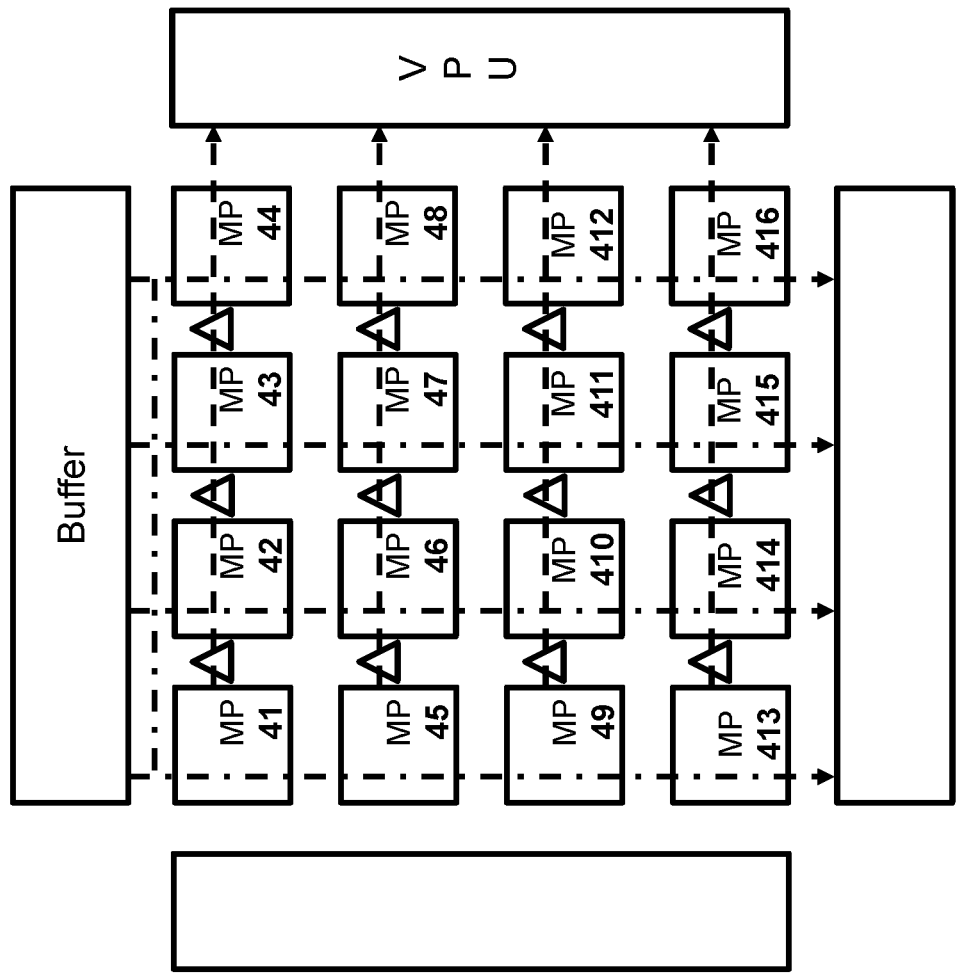
FIG. 4E illustrates how the partial results from FIG. 4D are combined to create a full result.

For example, FIG. 4D illustrates a matrix processor 401 that is specifically designed to operate on a 16 by 16 matrix but has instead been loaded with a subset of a 64 by 64 weight matrix 439. Referring to FIG. 4E, the subsets may be assigned to matrix processors in the manner that makes the entire matrix processor array into one large system for processing a 64 by 64 matrix. Specifically, matrix processor 41 is assigned the first sixteen elements of the first sixteen rows. Similarly, adjacent matrix processor 42 is assigned the next sixteen elements of the first sixteen rows, matrix processor 43 is assigned the third set of sixteen elements of the first sixteen rows, and matrix processor 44 is assigned the last sixteen elements of the first sixteen rows. In this manner the first row of matrix processors in the array (41 to 44) are configured to handle the first 16 rows of the 64 by 64 matrix. The remaining three rows are filled with remaining subsets of the 64 by 64 matrix in the same manner.

The matrix processor array configured as above then operates by sending the proper partial input data vector to each matrix processor to create partial result. As illustrated in FIG. 4D, the partial input data vector 421 is received on the operand bus, processed with the 16 by 16 matrix processing logic 467 with the subset of weight matrix 439, and then outputs a partial output data vector 491. The sixteen elements of the partial output data vector 491 are combined with corresponding output elements from the same row to create a final set of partial result elements for the row of matrix processors. For example, the outputs from the first row of matrix processors (41 to 44) are combined to create a first set of sixteen elements for final result. The other three rows of matrix processors also create sixteen elements each thus creating a final 64 element final output vector in the Vector Processing Unit.

The 64 by 64 element matrix example set forth with FIGS. 4A to 4D is the largest matrix that can be natively handled by the 4 by 4 matrix processor array in of FIG. 4D. In that example, the 64 by 64 matrix is spread across all of the space in the matrix processor array. To handle larger matrices, the dimension of time must be used.

Figure 4F:
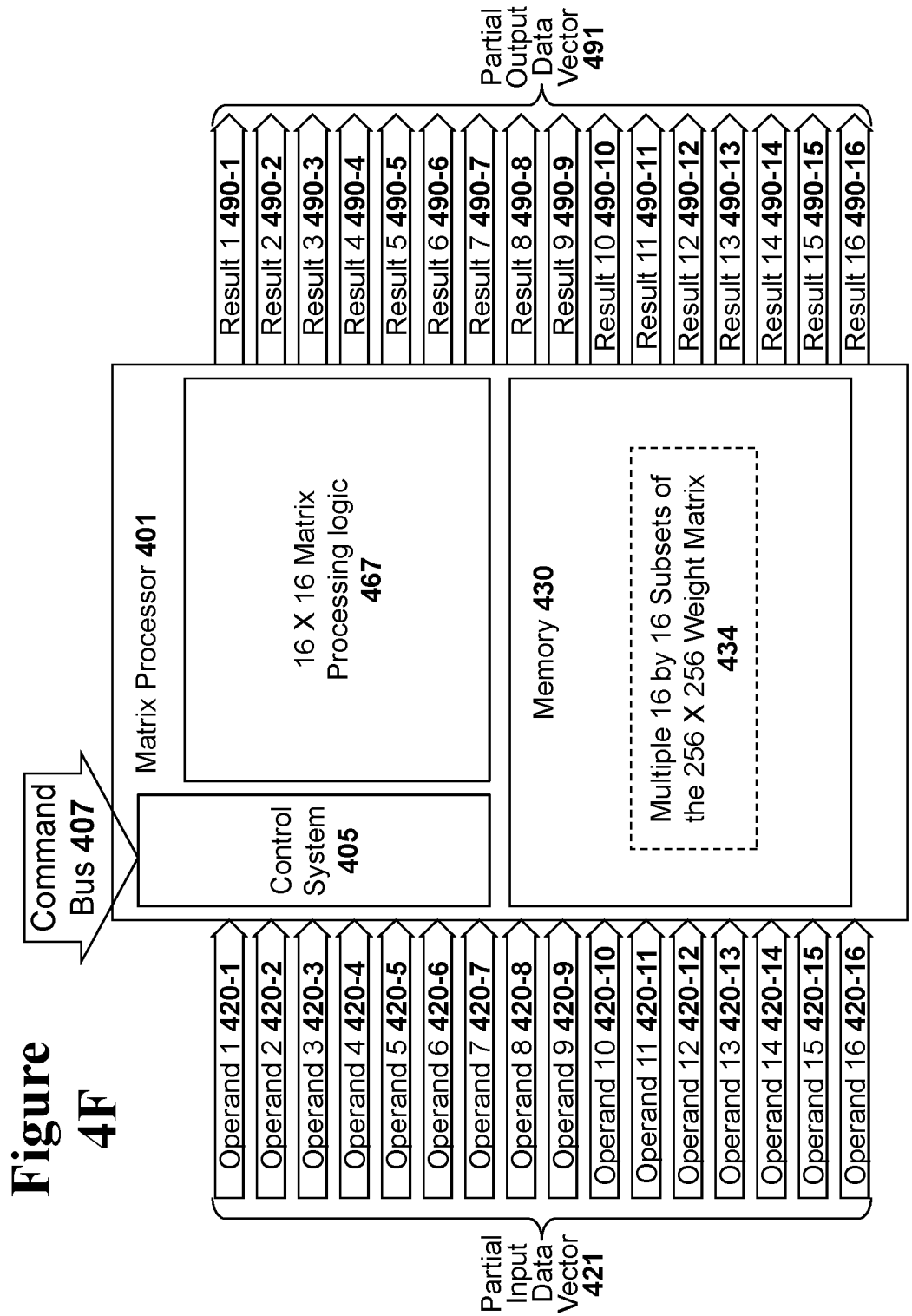
FIG. 4F illustrates an abstracted matrix processor that is specifically designed to operate on a 16 by 16 matrix being used to process multiple subsets of a 256 by 256 matrix to create a partial result.

For example, to handle a 256 by 256 matrix, each individual matrix processor in the matrix processor array must handle multiple 16 by 16 sections of the larger 256 by 256 matrix. FIG. 4F illustrates a matrix processor 401 that has been loaded with sixteen different 16 by 16 subsets of a 256 by 256 weight matrix 434. Referring to FIG. 4D, it may be matrix processor 41 that is loaded with the first four sets of 16 elements from the first 16 rows of the weight matrix, the first four sets of 16 elements from the next 16 rows, and so until matrix processor 401 contains the upper-left 64 by 64 patch of the overall 256 by 256 array. Similarly, the next three adjacent matrix processors 42 to 44 in the same row each contain the next four 64 by 64 patches of the overall 256 by 256 array. The next three rows of matrix processors (45 to 416) also each contain four 64 by 64 patches of the overall 256 by 256 array to complete the full overall 256 by 256 array.

To execute a full 256 by 256 matrix operation, each individual matrix processor serially performs four sets of 16 by 16 matrix operations for the first row of 16 by 16 patches and outputs the partial results rightward to the Vector Processing unit. The outputs during each 16 by 16 matrix operations are combined with the triangle combiner illustrated in FIG. 4E as they are passed to the Vector Processing Unit (VPU) on the right. The Vector Processing Unit (VPU) combines the partial results from the first four 16×16 patches to complete a set of 16 rows.

Each matrix processor then proceeds through the next row with a set of four 16 by 16 patches to create the partial data needed to create the next 16 rows of partial results. And so on for the next two rows of four sets of 16 by 16 patches each. Ultimately, each individual matrix processor processes 16 batches of 16 by 16 matrix data. This is equivalent to a 64 by 64 patch. With each matrix processor handling a 64 by 64 patch of the full 256 by 256 matrix, all sixteen matrix processors complete the full 256 by 256 matrix array operation.

Note that this system requires spreading the large 256 by 256 matrix across both space (the 16 matrix processors that can only handle 16 by 16 matrix each) and across time (every one of the 16 matrix processors must process matrix operations 16 times). But the sum total of matrix elements processed is 16*16*16*16=256*256=65,536 matrix elements.

Note that in this manner any sized matrix array can be handled. Again, array sizes that do not perfectly line up with the size matrix array can be handled by having rows and columns of zeroed out elements.

Reflexive Matrix Processor Array

The Matrix Processor array illustrated in FIGS. 3A to 3F has been designed to operate generally in a single direction. Specifically, operand data vectors are loaded in from the left Buffer 1 or top Buffer 2 and result data vectors are output to the right Vector Processing Unit 1 (VPU1) or the bottom Vector Processing Unit 2 (VPU2). A problem with this design is that often the data needed for a subsequent operation will be located in a destination Vector Processing Unit when that data is really needed in a buffer unit as input data for a subsequent operation.

For example, referring to FIG. 3D, a first forward propagation operation may product a result output vector at Vector Processing Unit 1. But in a multi-layer artificial neural network, that result output vector data is the input data vector for the next layer of the multi-layer artificial neural network. Thus, that output vector data needs to be moved from Vector Processing Unit 1 (VPU2) back to Buffer 2 (or to Buffer 1) in order to perform matrix operations for the next layer of the multi-layer artificial neural network. Moving data vectors around the matrix processor array takes time and the entire matrix processor array may be idle during such data movements thus wasting very valuable processing resources.

Figure 5A:
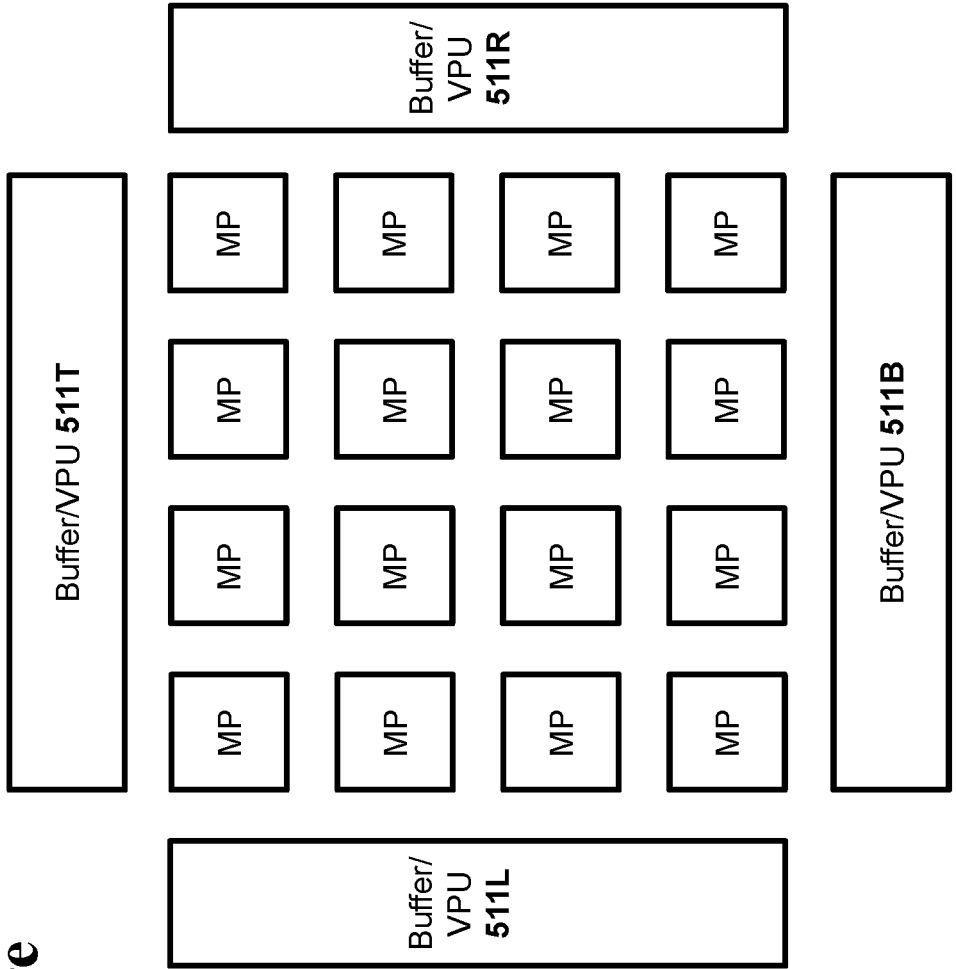
FIG. 5A illustrates a block diagram of reflexive array of Matrix Processors surrounded on all sides by combined buffer and vector processor units.

To remedy this shortcoming, all sides of the matrix processor array may be made designed to operate in any direction. FIG. 5A illustrates an embodiment of a reflexive matrix processor array. The Reflexive Matrix Processor array is surrounded on all four sides with combined Buffer & Vector Processing units 511L, 511T, 511R, and 511B. Whenever a particular side of the needs to provide operand data then that side operates in buffer mode. Conversely, when a particular side needs to receive data vectors then that side operates in Vector Processing Unit (VPU) mode. In this manner, the matrix processing can be performed in any direction. Specifically, any side of the matrix processor array may act as the source of operand vectors and any side of the matrix processor array may receive a result data vectors.

Figure 5B:
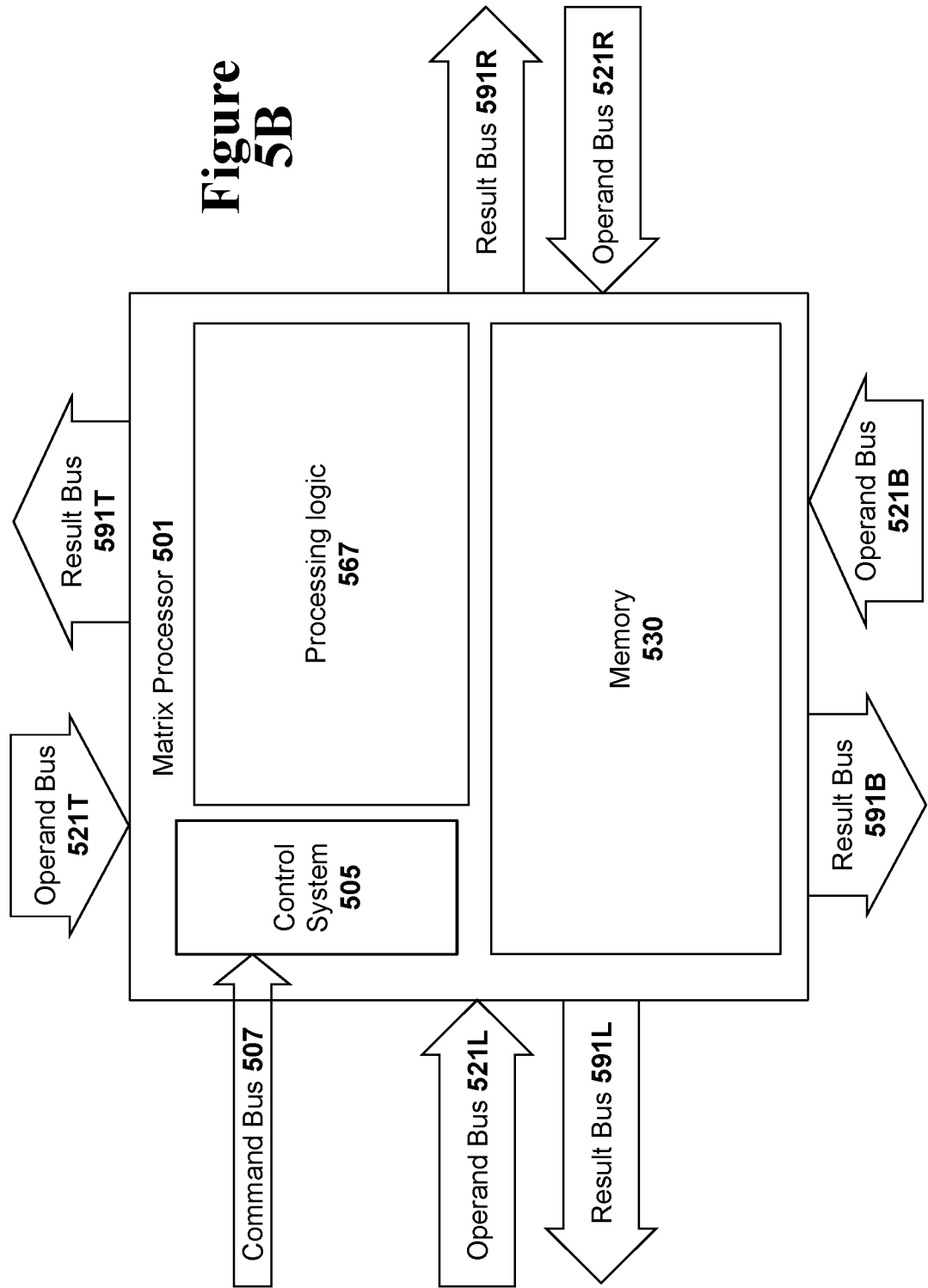
FIG. 5B illustrates a block diagram of an abstracted Matrix Processor that is connected on all four sides with both operand buses and result buses.

To implement a reflexive matrix processor array, additional buses must be added to the matrix processor array. FIG. 5B illustrates a revised version of the abstracted matrix processor of FIG. 2C for use within a reflexive matrix processor array. The matrix processor 501 now includes four operand buses and four result buses. The operand buses 521L, 521T, 521R, and 521B are connected to Buffer & Vector Processing units 511L, 511T, 511R, and 511B, respectively such that the matrix processor 501 can receive data vectors from any side. Similarly, the operand buses 591L, 591T, 591R, and 591B are connected to Buffer & Vector Processing units 511L, 511T, 511R, and 511B, respectively such that the matrix processor 501 can output data vectors any side. The command bus 507 informs the Control System 505 as to which bus to use and when. Data received on the operand buses may be used directly by the processing logic 367 or may be stored in memory 530 for later usage.

FIG. 5C illustrates the bus support structure for the matrix processor array. Specifically, every side of the matrix processor array handles both four operand buses 521 and four result buses 591.

Basic Reflexive Matrix Processor Array Operations

The Reflexive Matrix Processor Array disclosed in the previous section adds significant flexibility to the matrix processor array. The disclosed reflexive matrix processor array has been designed to perform matrix operations for artificial neural network applications. Thus, the primary matrix operations used by artificial neural networks will be discussed. Specifically, the forward pass operation used for making inferences, the backward propagation operation used for detecting errors, and the weight update operation for updating weight matrix values are the main focus.

The forward pass, backward propagation, and weight update operations are generally performed for every new data vector while an artificial neural network is being trained. All three are computationally intensive and the second two operations depend on data from the previous operations.

Figure 6A:
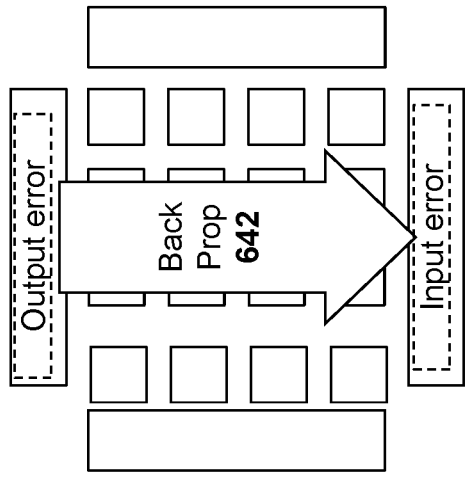
FIG. 6A illustrates a horizontal left to right forward pass operation.
Figure 6B:
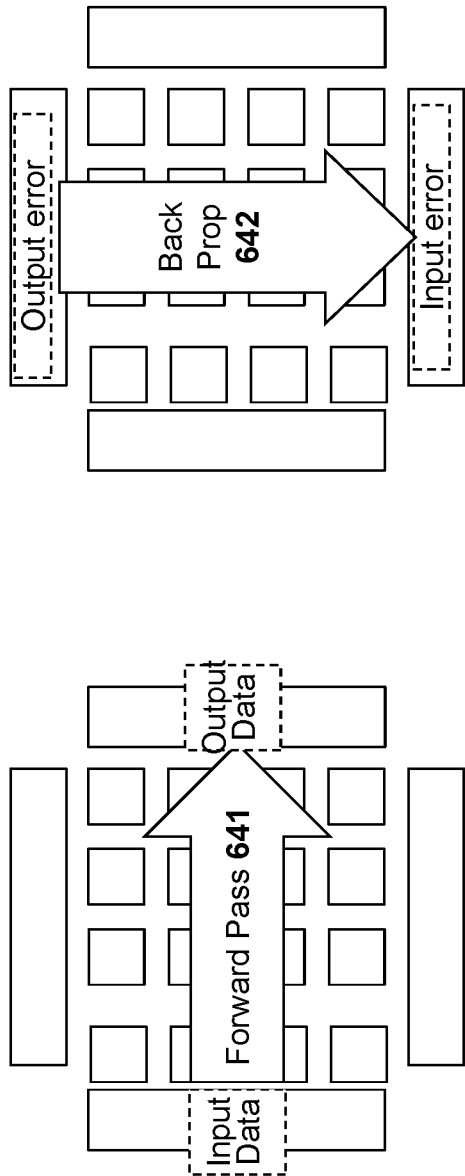
FIG. 6B illustrates a vertical top to bottom backward propagation operation.
Figure 6C:
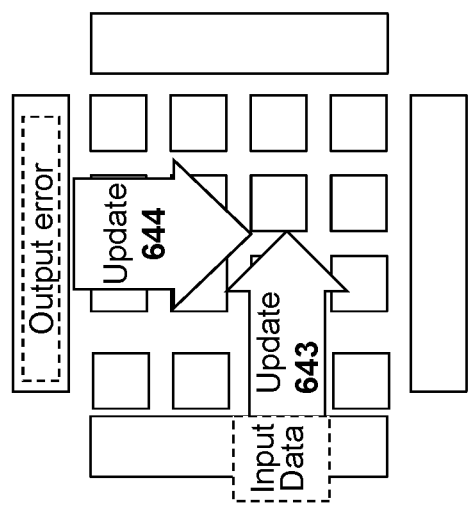
FIG. 6C illustrates a weight update operation.

FIGS. 6A to 6C illustrate the three artificial neural network operations for a simple schedule of a single layer network. Details from the diagrams have been omitted for clarity. FIG. 6A illustrates the forward pass operation 641. In the forward pass operation 641 of FIG. 6A the operand data vector enters from the buffer on the left and the results of the inference operation exit to a vector processing unit on the right.

Next, FIG. 6B illustrates a back propagation operation 642 that determines the input error from the previous forward pass operation 641. The output error data vector enters from the buffer at the top and the calculated input error result vector exits to a vector processing unit on the bottom.

Finally, FIG. 6C illustrates a weight update operation that adjusts the weights based on the input data vector (update 643) and the output error vector (update 644) from the previous back propagation operation.

Figure 7A:
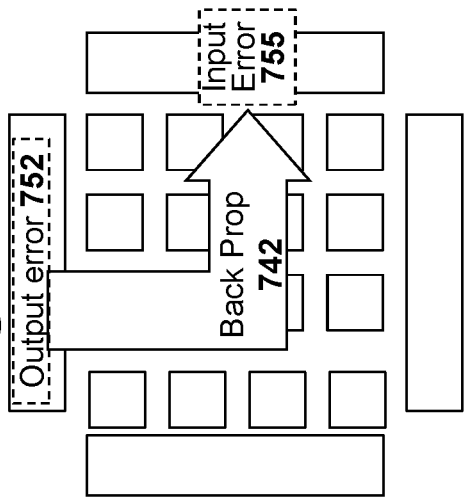
FIG. 7A illustrates a left to top forward pass operation.
Figure 7B:
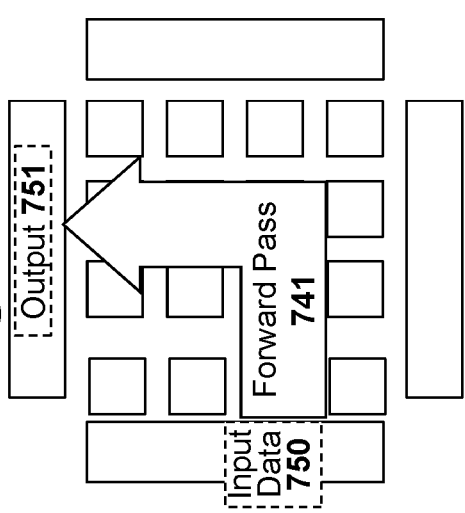
FIG. 7B illustrates a top to right backward propagation.
Figure 7C:
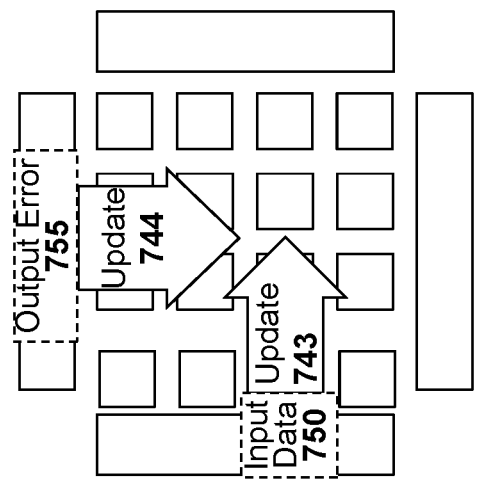
FIG. 7C illustrates a weight update operation.

FIGS. 7A to 7C illustrate the three artificial neural network operations for an orthogonal schedule of a single layer network. Referring to FIG. 7A, for a forward pass operation 741 input data vector 750 enters from the left and output data vector 751 exits to a vector processing unit at the top.

Next, FIG. 7B illustrates a back propagation operation 742 that determines the input error from the previous forward pass operation 741. Specifically, the backward propagation operation 742 processes the output error 752 from the top to create an input error vector 755 that exits on the right.

Finally, FIG. 7C illustrates an update (743, 744) of the matrix weights. Referring to FIG. 7C, the original input data vector 750 from the left and the input error 755 from the top are used to calculate weight adjustments. The weight adjustments may be applied to weight adjustment gradient matrix that accumulates changes or may be applied directly to the weight matrix.

Finally, FIG. 7C illustrates an update of the matrix weights. Referring to FIG. 7C, the original input data 750 from the left and the input error 755 from the top are used to calculate weight adjustments. The weight adjustments may be may be applied to weight adjustment gradient matrix that accumulates changes or may be applied directly to the weight matrix.

Reflexive Two-Layer Matrix Processor Array Operation

With more complex artificial neural networks, one needs to carefully consider the scheduling of the matrix processors in the matrix processor array. Specifically, one must carefully schedule the matrix processor operations in a manner that minimizes the idling of the available matrix processor resources due to data dependencies.

With a multi-layer artificial neural network, all forward pass operations must be performed in order since higher layers depend on data from the lower layers. Furthermore, all forward pass operations must be completed before the backward propagation operations can begin. The backward propagation operations must be performed in the reverse order of the forward propagation operations since each backward propagation operation depends on data from higher layers. The weight update operations can only be performed when both the forward propagation and backward propagation operations have been performed for that layer.

Various different methods of operation will be disclosed including a simple scheduling, a reflexive scheduling, and an orthogonal scheduling. Each method of operation has unique properties that will be discussed.

The first two-layer scheduling system to be disclosed is a simple scheduling. The simple scheduling system can be executed using the original matrix processor array of FIGS. 3A to 3F. The simple scheduling system is mainly being shown to allow a contrast between it and the more efficient scheduling systems that require the reflexive matrix processor array.

Figure 8A:
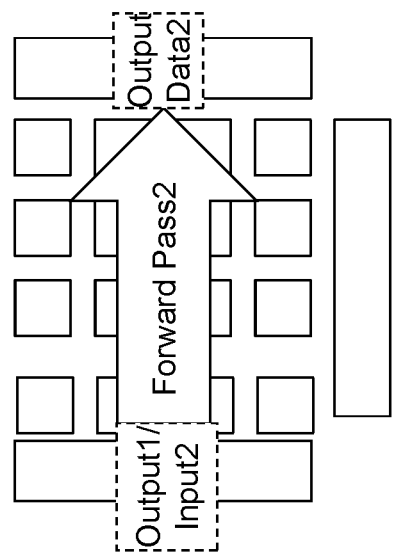
FIG. 8A illustrates a first horizontal left to right forward pass operation.
Figure 8B:
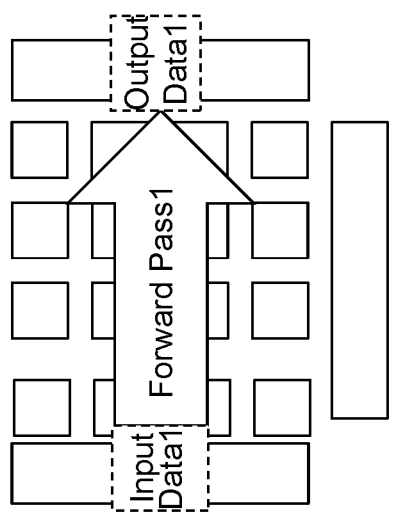
FIG. 8B illustrates a second horizontal left to right forward pass operation.

Referring to FIG. 8A, on the first layer forward pass 1 the input data1 at the left is processed into output data1 on the right. That output data1 is also the input data2 for the next layer. Thus, that input data2 must be moved back to the left side for the second layer forward pass 2 illustrated in FIG. 8B to create output data2 on the right.

Figure 8C:
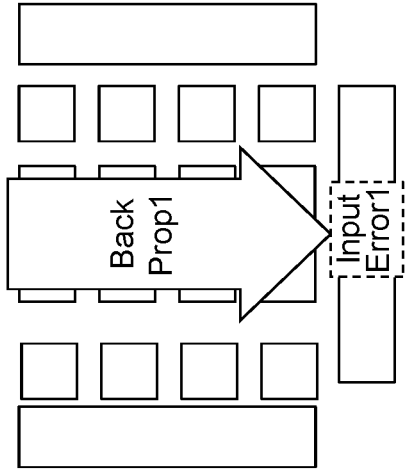
FIG. 8C illustrates a vertical top to bottom backward propagation operation for the forward pass of FIG. 8B.
Figure 8D:
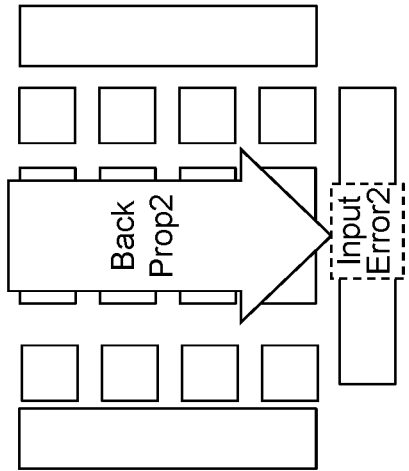
FIG. 8D illustrates a vertical top to bottom backward propagation operation for the forward pass of FIG. 8A.

The backward propagation begins by moving output data2 to the top buffer as output error2 and then performing back propagation Back Prop2 as illustrated in FIG. 8C to create input error2 at the bottom. Input error2 is then used to calculate output error1 for the final back propagation Back Prop1. FIG. 8D illustrates the back propagation Back Prop1 of output error1 to created input error1.

Figure 8F:
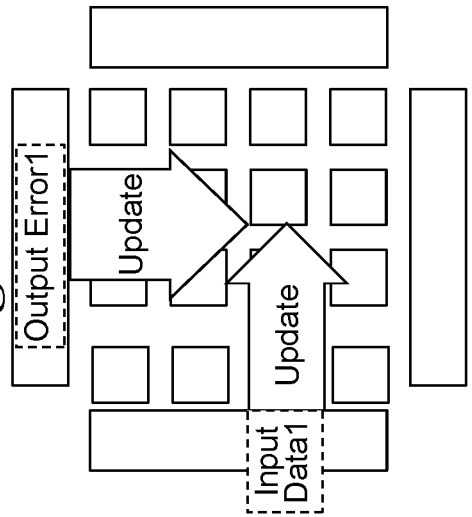
FIG. 8F illustrates a weight update operation for the backward propagation operation of FIG. 8D.
Figure 8E:
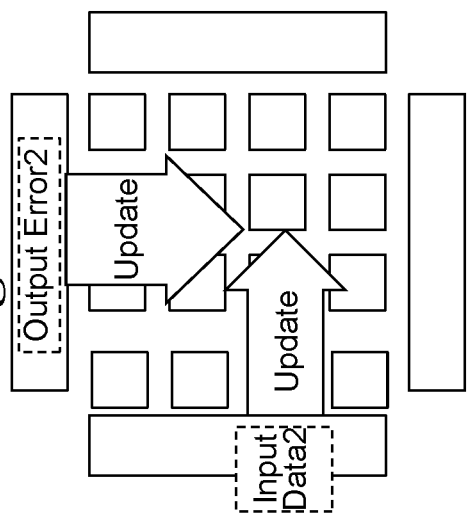
FIG. 8E illustrates a weight update operation for the backward propagation operation of FIG. 8C.

Finally, the weight updates can be processed. FIG. 8E illustrates output error2 at the top combined with input data2 to update the weights for the second layer. Similarly, FIG. 8F illustrates output error1 at the top combined with input data1 from the right to update the weights for the second layer.

Note that in this simple scheduling, the required data is almost never available at the buffer where that data is required. Thus, time must be spent moving the data around leaving the matrix processor idle. To improve upon this, basic reflexive scheduling can be used.

Figure 9B:
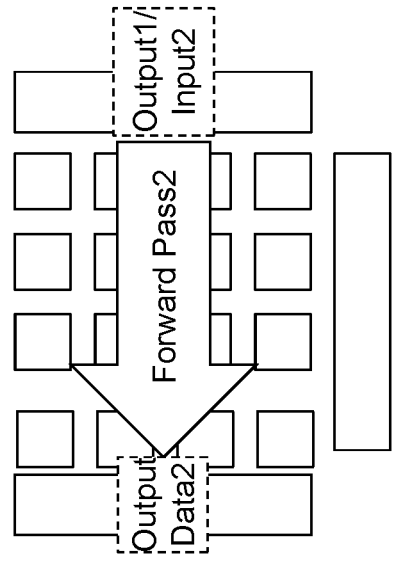
FIG. 9B illustrates a reflexive second horizontal forward pass operation in a right to left manner.
Figure 9D:
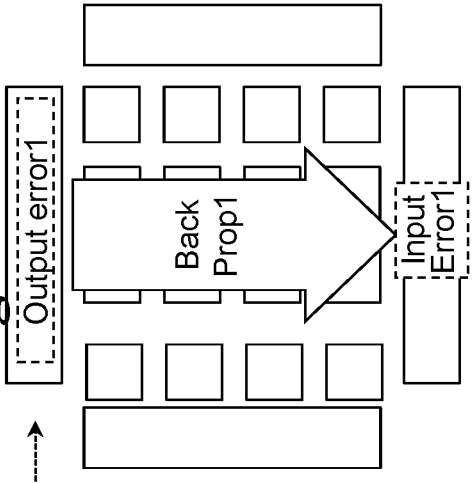
FIG. 9D illustrates a vertical top to bottom backward propagation operation for the forward pass of FIG. 9A.
Figure 9A:
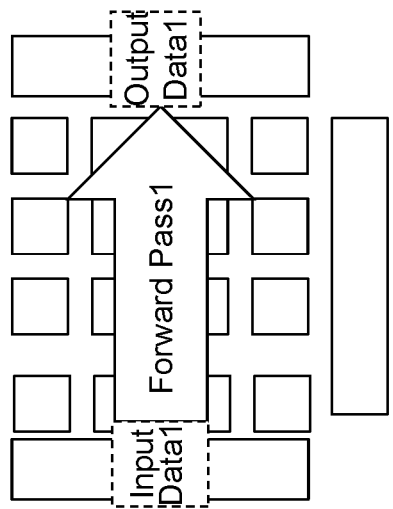
FIG. 9A illustrates a first horizontal left to right forward pass operation.

FIGS. 9A to 9F illustrate the improved performance of reflexive scheduling. Referring to FIG. 9A, a first forward pass (Forward Pass1) takes input data on the left and processes it to create output data1 on the right. This output data1 is also the input data 2 for the second layer. FIG. 9B illustrates this input data2 processed (Forward Pass2) from the left to output data 2 on the right. Note that the input data2 was already present such that the forward pass for the second layer could immediately be performed.

Figure 9C:
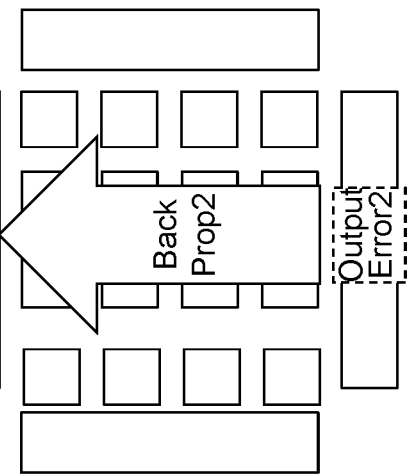
FIG. 9C illustrates a vertical bottom to top backward propagation operation for the forward pass of FIG. 9B.

Next, FIG. 9C illustrates a back propagation (Back Prop2) for the second layer wherein the output error2 is processed from the bottom to calculate input error2 at the top. Input error2 is then used to calculate output error 1 within the top VPU. This allows the back propagation (Back Prop1) for layer 1 to be quickly calculated from output error1 at the top to calculated input error1 at the bottom.

Figure 9F:
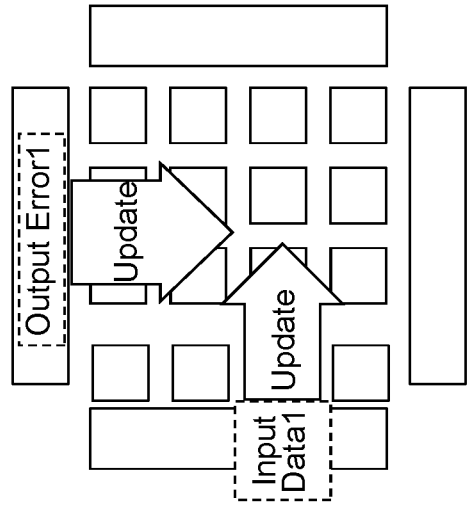
FIG. 9F illustrates a weight update operation for the backward propagation operation of FIG. 9D.
Figure 9E:
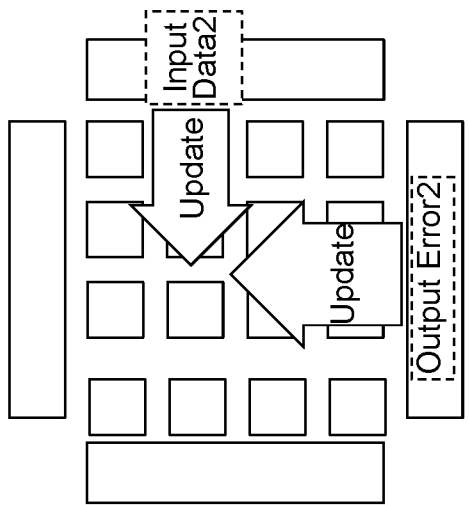
FIG. 9E illustrates a weight update operation for the backward propagation operation of FIG. 9C.

Finally, FIG. 9E illustrates a weight update for the second layer using the input data2 from the right and the output error2 from the bottom and FIG. 9F illustrates the weight update using input data1 from the right and output error1 from the top. Note that the input data for both weight updates are from their original positions.

The reflexive scheduling of FIGS. 9A to 9F operates much more efficiently than the simple scheduling system illustrated in FIGS. 8A to 8F. However, there are still some data movements. Furthermore, the orthogonal processing system can be more efficient for partial result combinations that are often required as set forth in the earlier section on distributing weight values to matrix processors matrix processor array.

Figure 10A:
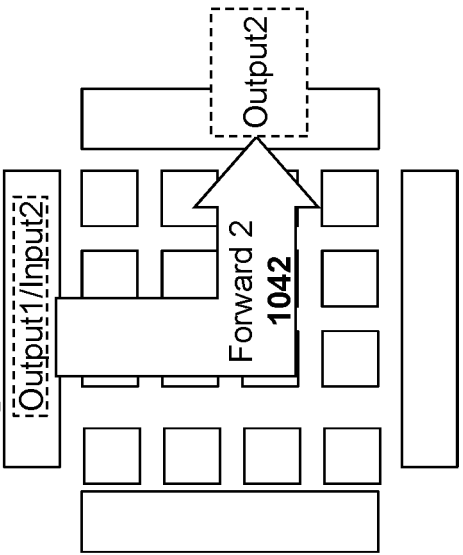
FIG. 10A illustrates a first left to top forward pass operation.

FIGS. 10A to 10F illustrate the operations for an orthogonal operation mode for a two-layer artificial neural network. Referring to FIG. 10A, input data1 for a first layer is processed with an orthogonal forward pass 1041 to create an output vector in the top VPU. That output1 data vector is the input2 data for the second layer. To efficiently operate, that input2 is immediately then processed with an orthogonal forward pass 1042 to create output2 vector on the right.

Figure 10B:
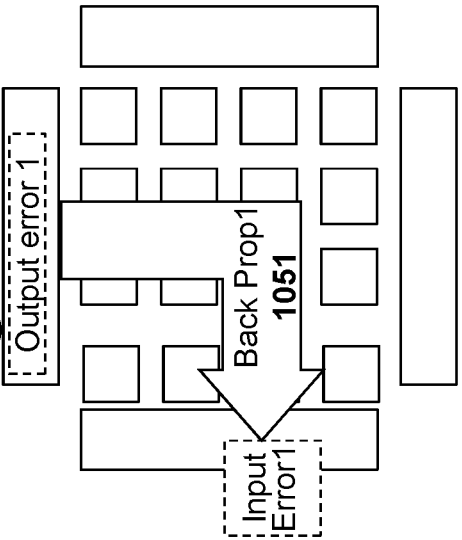
FIG. 10B illustrates a second forward pass operation in a top to right manner.
Figure 10C:
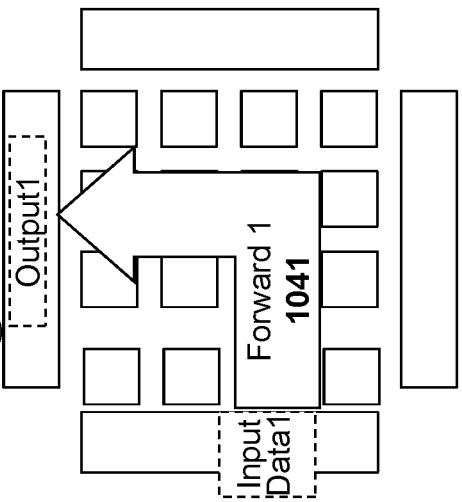
FIG. 10C illustrates a right to top backward propagation operation for the forward pass of FIG. 10B.
Figure 10D:
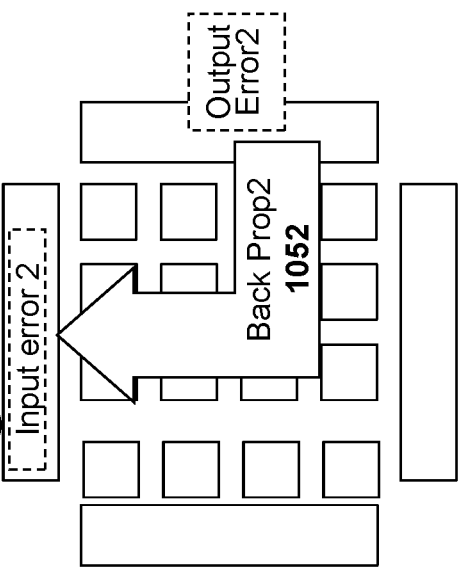
FIG. 10D illustrates a top to left backward propagation operation for the forward pass of FIG. 10A.

Next, the back propagation operations begin. Output2 vector of FIG. 10B is used to create an output error2 vector on the right that can immediately be processed with back propagation 1052 to create input error2 in the top VPU. Input error 2 is then used to create output error1 in the top VPU. Thus, the next back propagation 1051 operation creates input error1 in the left VPU. Note that in all of these operations, no data movement was required.

Finally, the weight updates can be performed. FIG. 10E illustrates using input data2 available in the top buffer combined with Output error data2 from the right buffer to update the weights for the second layer. Similarly, FIG. 10F illustrates output error1 available in the top buffer combined with input data1 from the left buffer to update the weights.

The reflexive Matrix Processor array can be very efficient and implementing multi-layer neural networks since, as illustrated with the reflexive scheduling and orthogonal scheduling the output data from a first layer becomes the input data for a next layer. Specifically, a forward pass for one layer immediately produces output data that can be can immediately be used for the next for the layer.

The orthogonal scheduling can be scaled up indefinitely by rotating through the different sides until the final layer is reached. The system then reverses directions to perform the back propagation operations. FIGS. 11A to 11H illustrate the rotational scheduling for a four layer artificial neural network.

Figure 11A:
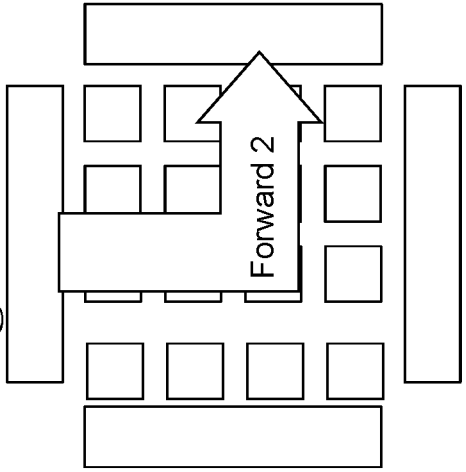
FIG. 11A illustrates a first left to top forward pass operation.
Figure 11B:
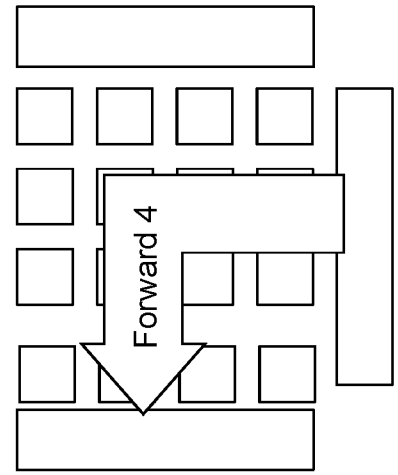
FIG. 11B illustrates a second forward pass operation in a top to right manner.
Figure 11C:
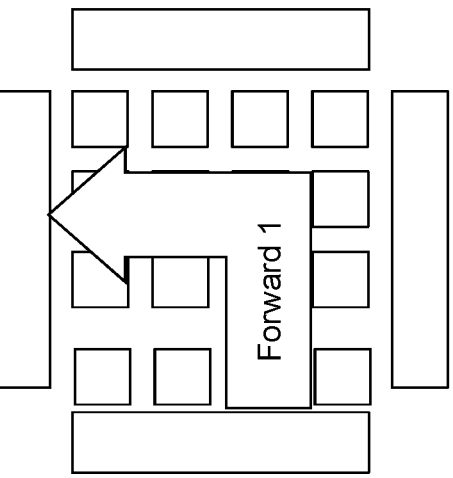
FIG. 11C illustrates a third forward pass operation in a right to bottom manner.
Figure 11D:
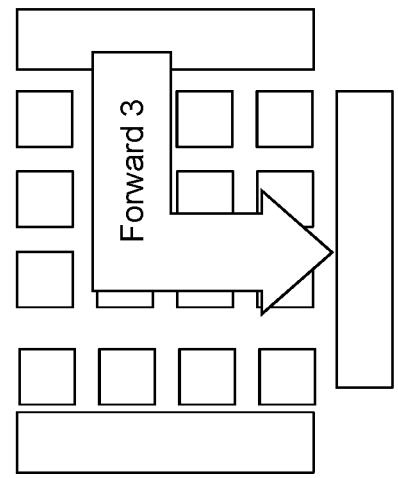
FIG. 11D illustrates a fourth forward pass operation in a bottom to left manner.

Referring to FIG. 11A, the forward pass operation (Forward 1) for a first layer starts at the left and creates an output vector at the top. That output vector is the input for the next forward pass (Forward 2) that creates an output vector at the right as illustrated in FIG. 11B. That output on the right is processed with a third forward pass (Forward 3) to create an output vector at the bottom as illustrated in FIG. 11C. Finally, as illustrated in FIG. 11D, the output vector is used as an input vector to create a final output vector on the right with a fourth forward pass (Forward 4). Thus, the system works in a clockwise rotating manner around the different sides of the matrix processor array. Note that all of these operations were performed without moving any data.

Figure 11E:
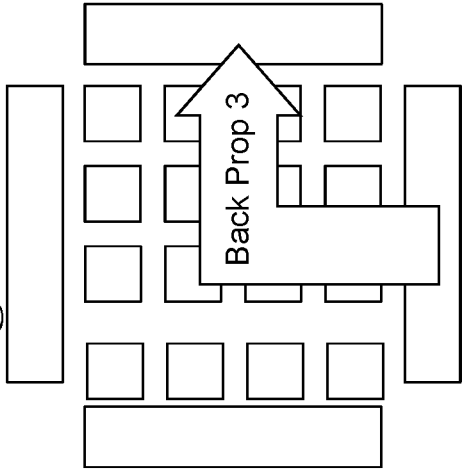
FIG. 11E illustrates a right to bottom backward propagation operation for the forward pass of FIG. 11D.
Figure 11F:
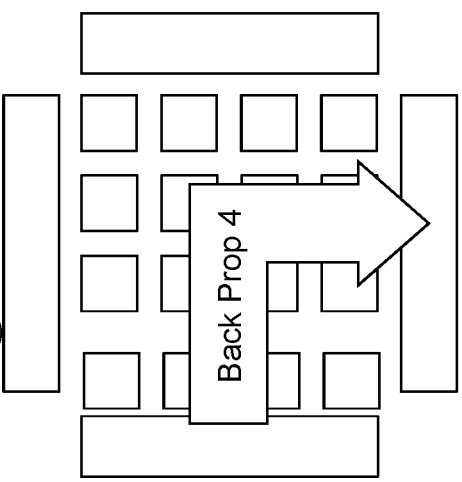
FIG. 11F illustrates a bottom to right backward propagation operation for the forward pass of FIG. 11C.
Figure 11G:
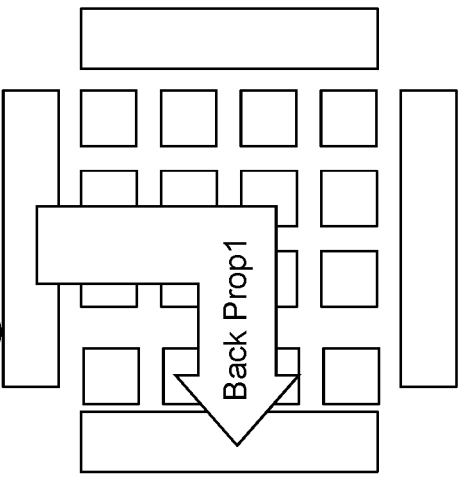
FIG. 11G illustrates a right to top backward propagation operation for the forward pass of FIG. 11B.
Figure 11H:
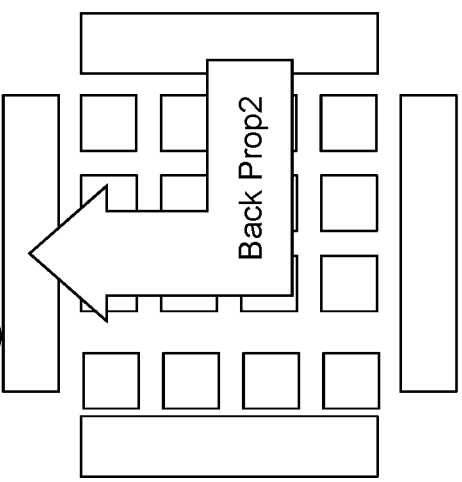
FIG. 11H illustrates a top to left backward propagation operation for the forward pass of FIG. 11A.

The back propagation can operate in the same manner by reversing the rotation direction to counter-clockwise. A top (fourth) layer data error value is calculated on the left and then processed with a back propagation operation (Back Prop 4) to create an input error value at the bottom as illustrated in FIG. 11E. That input error value is then used in the next back propagation (Back Prop 3) in 11F. The back propagation operations (Back Prop 2 and Back Prop 1) proceed for the second and first layers as depicted in FIGS. 11G and 11H until the system is back at original left starting point. Again, note that no movement of data was required such that there was no idling of the matrix processors in the matrix processor array.

Reflexive Matrix Processor Array State Data Movements

The Matrix Processor Array disclosed in the previous sections has an extensive bus network for moving data around the matrix processor array. Specifically, FIGS. 3A-1, 3A-2, 5B, and 5C illustrate some of the possible bus embodiments. These bus embodiments have been described operating in a simple multi-layer artificial neural network environment.

Figure 12A:
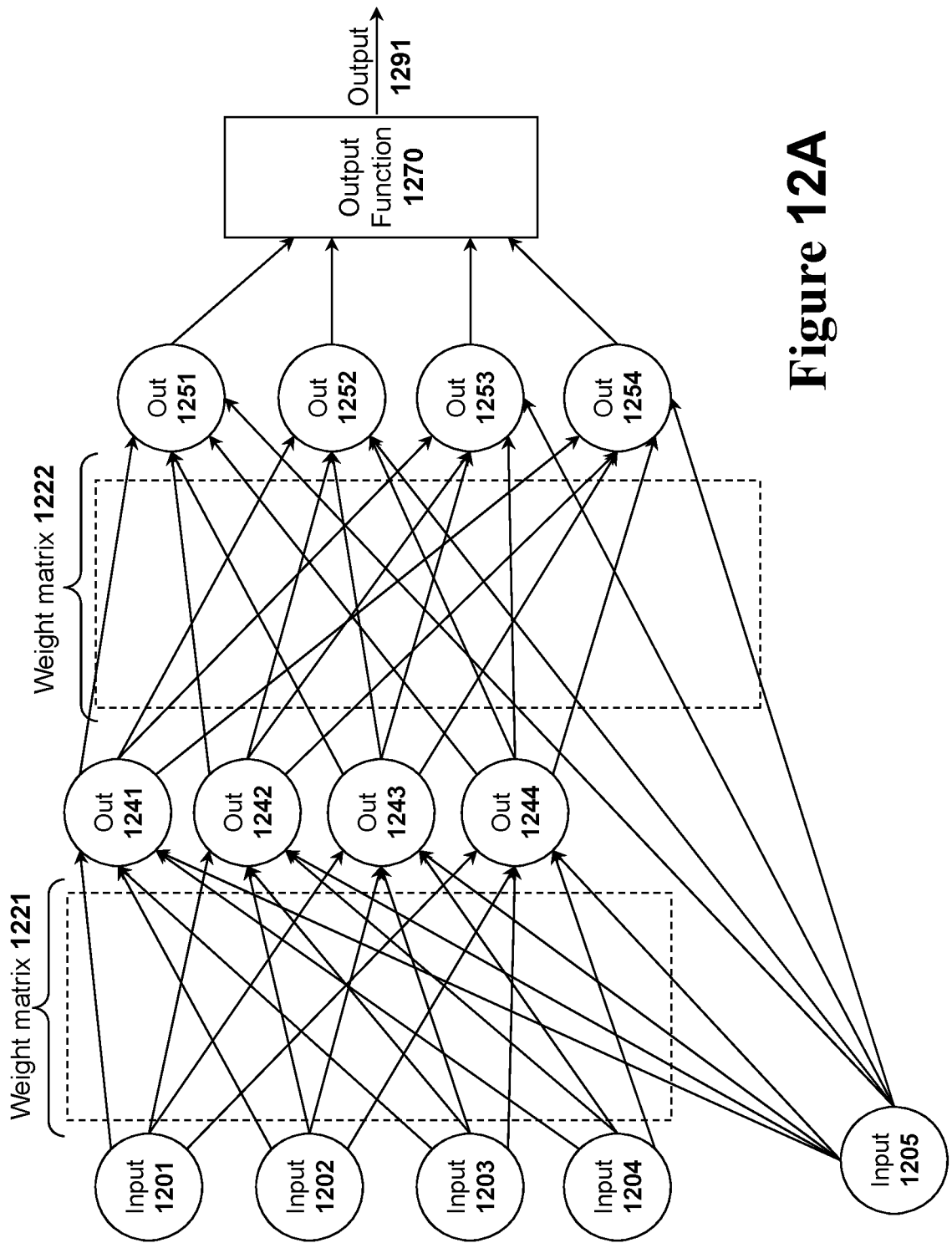
FIG. 12A illustrates an artificial neural network that uses input data from a low layer as input data that is also used in a higher layer.

However, there are many variations that may be implemented in artificial neural networks. For example, FIG. 12A illustrates an artificial neural network that uses input data from a low layer as input data that is also used in a higher layer. Specifically, in the artificial neural network of FIG. 12A, input data 1205 that is used conventionally in the first neural network layer (depicted with weight matrix 1221) is also used as input data in the second neural network layer (depicted with weight matrix 1222). Thus, the input data 1205 must be provided to both the processing of the first and second layers of the artificial neural network.

To do this, the extensive bus system of the disclosed matrix processor array can be used to move data around as necessary. For example, FIG. 12B illustrates a matrix processor array performing a forward pass operation 1241 that processes all of the input data vector values (input data 1201 to 1205) through the first layer of the artificial neural network to create an output data vector 1 that is part of the input vector for next layer.

However, to process the second artificial neural network layer, the input data 1205 is also required. Thus, the input data 1205 is passed with a data pass through operation as illustrated in FIG. 12C. In this manner, all of the data values required for the second artificial neural network layer are available in the top buffer such that second forward pass operation 1242 may be performed. Note that due to the large amount of bus capacity, the pass thru operation can be performed at the same time that other operations are being performed such that there is no reduction in performance.

There are many other such data movement operations that may be performed with the matrix processor array system. For example, some neural network operations use data feedback operations wherein a subset of state data is returned to earlier layers for processing with later layers. Again, the extensive bus system of the matrix processor array can easily handle this requirement.

Figure 13A:
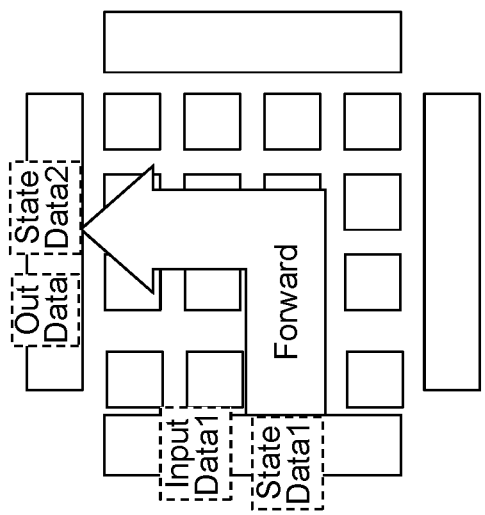
FIG. 13A illustrates a matrix processor configuration for a network that uses feedback state data.

FIG. 13A illustrates a matrix processor array system that processes data from the left side to the top. That system uses both input data1 and state data 1 to perform operations that create output data and state data2. However, for subsequent operations, that state data 2 needs to be returned to the input area for use on subsequent operations. This is performed as illustrated in FIGS. 13B and 13C.

Figure 13C:
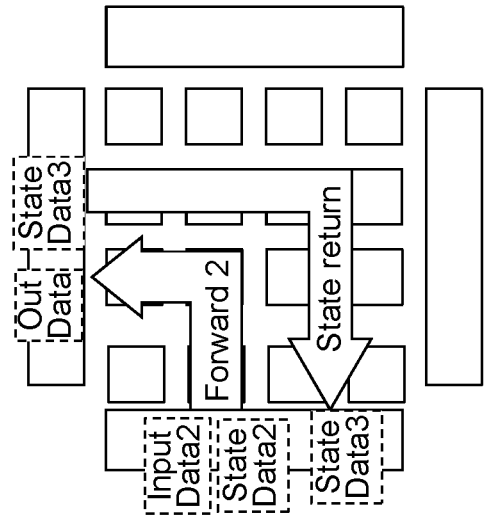
FIG. 13C illustrates a second left to top forward pass operation that also passes back state data top to left data for a subsequent operation.
Figure 13B:
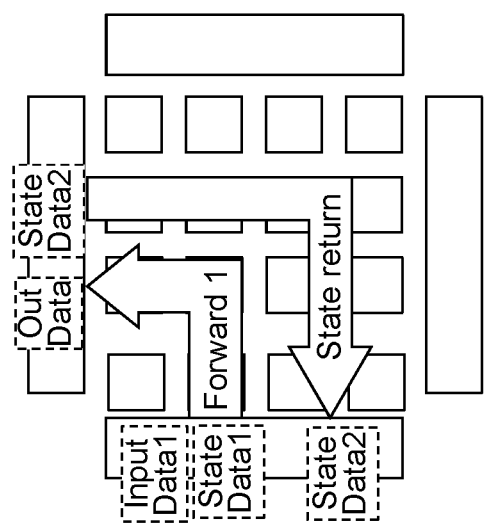
FIG. 13B illustrates a first left to top forward pass operation that also passes back state data top to left data for a subsequent operation.

Referring to FIG. 13B, the system starts with input data 1 and state data 1 on the left side. A forward pass operation 1 is performed to create output data 2 and state data 2. However, as soon as state data 2 is available, that state data is moved back to the left side such that the state return passes back the state data 2 to the left side.

With the state data 2 back at the left side, a subsequent forward pass operation 2 can be performed with input data 2 and state data 2 in order to create output data and state data 3 as illustrated in FIG. 13C. Again, the state data 3 is immediately passed back using available bus capacity to the left side such that it can be used in the next forward pass operation.

As set for above, the extensive bus system of the disclosed matrix processor array system allows for data to be moved around very efficiently with little or no effect on matrix operations being performed.

Matrix Processor Array System Advantages

The matrix processor array embodiments disclosed in this document allow for the system to very efficiently perform the matrix operations commonly used within most artificial intelligence applications. In particular, there are two very important elements that allow the disclosed system to operate significantly better than existing systems: the deep and wide memory system close to the matrix computing and the low-latency pipelined system that easily handles both forward and backward propagation. The advantages of each of these features will be described below. The combination of these features allows the system to synergistically provide previous unseen performance.

Referring back to FIG. 2C, each matrix processor includes a memory system 230. The memory system 230 is both wide and deep. The memory is wide in that entire multiple-data-element data vectors can be accessed by the processing logic 267. The memory is deep in that entire weight matrices may be stored within the memory 230. Multiple weight matrices allow various different layers to be handled without reloading the matrix processor 201. Gradient matrices may be stored for period weight matrix updates. Result data vectors from forward pass operations may be stored for later use in back propagation operations. By having a wide and deep memory, the matrix processor can minimize the amount of data that needs to be moved around and thus minimize latency caused by reloading data.

The second very important feature is the low-latency pipelined nature of the matrix processor array system that easily handles both forward and backward propagation operations. This low latency operation is implemented at both the individual matrix processor array level and the matrix processor array level. Each individual matrix processor is designed to very efficiently perform matrix operations and quickly provide a result.

When multiple matrix processors are assembled into an array, the array can efficiently perform large matrix operations by dividing the problem into subsets wherein each matrix processor generates partial results. The partial results from matrix processors are combined to create a final result. Since each matrix processor contains a wide and deep memory system, each matrix processor stores the needed weight matrices for matrix operations. As described with reference to FIGS. 11A to 11D, the matrix processor array can be used to perform forward pass matrix operations for multiple layers of an artificial neural network without any interruptions. Similarly, the backward propagation operations can also be performed without interruption as illustrated by FIGS. 11E to 11H.

As set forth in this document, each matrix processor and the matrix processor array in general is designed to efficiently perform both forward pass and backward propagation operations. Specifically, the weight matrices do not have to be reloaded or transposed thus there is no latency introduced by reloading weight matrices or transposing weight matrices as occurs in existing matrix processing circuits.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A digital processing circuit, said digital processing circuit comprising:
  a plurality of matrix processing units, said plurality of matrix processing units arranged into a matrix processor array comprising a plurality of rows and columns of the matrix processing units, each of said matrix processing units comprising:
    a left operand bus for receiving a first operand vector, the first operand vector comprising a plurality of operands, the left operand bus being a plurality of operands wide;
    a right result bus for outputting a result vector, the result vector comprising a plurality of result values, said right result bus being the plurality of result values wide;
  a memory for storing matrix data;
  a processing system for performing matrix operation, and a command input for receiving control commands;
  a plurality of combiner circuits, each said combiner circuits coupled to said right result bus such that result vectors from matrix processing units in a common row are combined with a first function; and
  a control system, said control system for loading weight matrices into said plurality of matrix processing units, loading in said first operand vector, and requesting a matrix operation by sending a control command on said command input.

2. The digital processing circuit of claim 1 wherein the result vectors from matrix processing units in a common column are combined with said first function.

3. The digital processing circuit of claim 1 wherein a first function comprises summation.

4. The digital processing circuit of claim 1 wherein each of said matrix processing units further comprises:
  a top operand bus for receiving a second operand vector, the second operand vector comprising a plurality of operands, the top operand bus being the plurality of operands wide; and
  a right result bus for outputting a second result vector, the second result vector comprising a plurality of result values, said right result bus perpendicular to said top operand bus, and the right result bus being the plurality of result values wide.

5. The digital processing circuit of claim 4 wherein said left operand bus is horizontal in said matrix processor array and said top operand bus is vertical in said matrix processor array.

6. The digital processing circuit of claim 4 wherein each of said matrix processing units further comprises:
  a right operand bus for receiving a third operand vector, the third operand vector comprising a plurality of operands, the right operand bus being a plurality of operands wide;
  a bottom operand bus for receiving a fourth operand vector, the fourth operand vector comprising a plurality of operands, the bottom operand bus being a plurality of operands wide;
  a bottom result bus for outputting a third result vector, the third result vector comprising a plurality of result values, said bottom result bus perpendicular to said right operand bus, and the bottom result bus being the plurality of result values wide; and
  a left result bus for outputting a fourth result vector, the fourth result vector comprising a plurality of result values, said left result bus perpendicular to said bottom operand bus, and the left result bus being the plurality of result values wide.

7. The digital processing circuit of claim 4, said digital processing circuit further comprising:
  a first buffer circuit on a first side of said matrix processor array, said first buffer circuit to provide said top operand vector;
  a second buffer circuit on a second side of said matrix processor array, said second buffer circuit to provide said top operand vector;
  a first vector processing unit on a third side of said matrix processor array, said first vector processing unit to receive said result vector; and
  a second vector processing unit on a fourth side of said matrix processor array, said second vector processing unit to receive said second result vector.

8. The digital processing circuit of claim 1, said digital processing circuit further comprising:
  a first buffer circuit on a first side of said matrix processor array, said first buffer circuit to provide said first operand vector; and
  a first vector processing unit on a second side of said matrix processor array, said first vector processing unit to receive said result vector.

9. A method of performing matrix operations in a digital processing circuit, said method comprising of:
  arranging a plurality of matrix processing units into a matrix processor array, said matrix processor array comprising a plurality of rows and columns of matrix processing units, each of said matrix processing units comprising:
    a left operand bus for receiving a first operand vector, the first operand vector comprising a plurality of operands, the left operand bus being a plurality of operands wide;
    perpendicularizing a bottom result bus for outputting a result vector, the result vector being a plurality of result values, said bottom result bus perpendicular to said left operand bus, and the bottom result bus being the plurality of result values wide;
  a memory for storing matrix data;
  a processing system for performing matrix operation, and a command input for receiving control commands;
  loading weight matrices into said plurality of matrix processing units; loading in said first operand vector;
  requesting a matrix operation by sending a control command on said command input; and
  combining result vectors from matrix processing units in a common row with a set of combiner circuits coupled to a bottom result bus such that result vectors from the matrix processing units in the common row are combined with a first function using said combiner circuits in said common row.

10. The method of performing matrix operations in a digital processing circuit as set forth in claim 9, said method further comprising:
  combining the result vectors from matrix processing units in a common column with said first function using combiner circuits in said common column.

11. The method of performing matrix operations in a digital processing circuit as set forth in claim 9 wherein said first function comprises summation.

12. The method of performing matrix operations in a digital processing circuit as set forth in claim 9 wherein each of said matrix processing units further comprises:
- a top operand bus for receiving a second operand vector, the second operand vector comprising a plurality of operands, the second operand bus being the plurality of operands wide; and
- a right result bus for outputting a second result vector, the second result vector comprising a plurality of result values, said right result bus perpendicular to said top operand bus, the right result bus being the plurality of result values wide.

13. The method of performing matrix operations in a digital processing circuit as set forth in claim 12 wherein said left operand bus is horizontal in said matrix processor array and said top operand bus is vertical in said matrix processor array.

14. The method of performing matrix operations in a digital processing circuit as set forth in claim 9, said method further comprising:
- providing said first operand vector on said left operand bus with a first buffer circuit on a first side of said matrix processor array; and
- receiving said result vector on said bottom result bus with a first vector processing unit on a second side of said matrix processor array.

15. The method of performing matrix operations in a digital processing circuit as set forth in claim 9 wherein each of said matrix processing units further comprises:
- a right operand bus for receiving a third operand vector, the third operand vector comprising a plurality of operands, the right operand bus being the plurality of operands wide;
- a bottom operand bus for receiving a fourth operand vector, the fourth operand vector comprising a plurality of operands, the bottom operand bus being the plurality of operands wide;
- a bottom result bus for outputting a third result vector, the third result vector comprising a plurality of result values, said bottom result bus perpendicular to said right operand bus, the bottom result bus being the plurality of result values wide; and
- a left result bus for outputting a fourth result vector, the fourth result vector comprising a plurality of result values, said left result bus perpendicular to said bottom operand bus, and the left result bus being the plurality of result values wide.

16. The method of performing matrix operations in a digital processing circuit as set forth in claim 12, said digital processing circuit further comprising:
- providing said left operand vector on said left operand bus with a first buffer circuit on a first side of said matrix processor array;
- providing said top operand vector on said top operand bus with a second buffer circuit on a second side of said matrix processor array;
- receiving said result vector on said bottom result bus with a first vector processing unit on a third side of said matrix processor array; and
- receiving said second result vector on said right result bus with a second vector processing unit on a fourth side of said matrix processor array.

* * * * *